United States Patent
Yoshikawa et al.

(10) Patent No.: US 6,538,579 B1
(45) Date of Patent: Mar. 25, 2003

(54) MOVING OBJECT DETECTION METHOD AND APPARATUS

(75) Inventors: Kazutoshi Yoshikawa, Toyota (JP); Shuichi Sunahara, Nishikamo-gun (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 0 days.

(21) Appl. No.: 08/790,787

(22) Filed: Jan. 30, 1997

(30) Foreign Application Priority Data

Feb. 8, 1996 (JP) .............................. 8-022504

(51) Int. Cl.[7] .................................. G08G 1/00
(52) U.S. Cl. ................... 340/928; 340/937; 340/939; 235/384; 348/148; 701/117
(58) Field of Search ................... 340/928, 933, 340/939, 937, 941; 348/148, 149; 701/117; 235/375, 384

(56) References Cited

U.S. PATENT DOCUMENTS

| | | | | |
|---|---|---|---|---|
| 5,402,118 A | | 3/1995 | Aoki | 340/937 |
| 5,523,753 A | * | 6/1996 | Fedde et al. | 340/939 |
| 5,537,110 A | * | 7/1996 | Iida et al. | 340/937 |
| 5,554,984 A | * | 9/1996 | Shigenaga et al. | 340/937 |
| 5,602,375 A | * | 2/1997 | Sunahara et al. | 235/384 |
| 5,640,156 A | * | 6/1997 | Okuda et al. | 340/932 |
| 5,734,337 A | * | 3/1998 | Kupersmit | 340/937 |

FOREIGN PATENT DOCUMENTS

| | | |
|---|---|---|
| EP | 0612050 | 8/1994 |
| EP | 616 302 | 9/1994 |
| EP | 0677828 | 10/1995 |
| JP | 54-106263 | 8/1979 |
| JP | 4-034684 | 2/1992 |
| JP | 8-186534 | 7/1996 |
| JP | 8-293049 | 11/1996 |

* cited by examiner

*Primary Examiner*—Daniel J. Wu
(74) *Attorney, Agent, or Firm*—Pillsbury Winthrop LLP

(57) ABSTRACT

A moving object detection method and apparatus is proposed in which a plurality of heads are installed above a detection line traversing a road, their outputs undergo A/D conversion and binary conversion, and the outputs are then linked along the detection line. A vehicle detection preprocessor performs, on the obtained linked 0/1 existence data, vehicle detection preprocesses of filling-up, noise rejection, width maintaining, Y character profile prevention, delaying, maximum width checking, and so forth, in a predetermined sequence. A vehicle detection processor separates and detects entering vehicles, existing vehicles, corrected/deleted vehicles, and so forth, from the linked 0/1 existence data after vehicle detection preprocessing. False detection of moving objects is reduced.

5 Claims, 40 Drawing Sheets

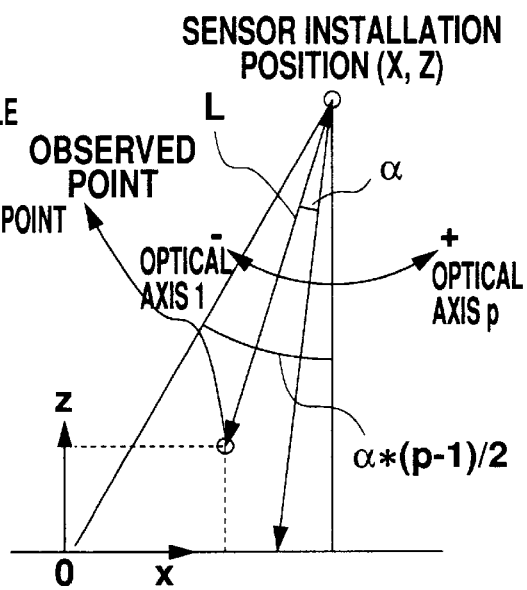

CONVERSION TO HEIGHT INFORMATION
- L : MEASURED DISTANCE OBTAINED FROM TABLE
- A : SENSOR INSTALLATION HEIGHT (=Z)
- α : ANGLE BETWEEN OPTICAL AXES
- m : OPTICAL AXIS NUMBER PASSING OBSERVED POINT
- p : NUMBER OF OPTICAL AXES

APPROXIMATE:
   HEIGHT FROM GROUND = A - L

PRECISE:
   X-AXIS = X - L · sin(α · (p-1)/2 - α · m)
   Z-AXIS = HEIGHT FROM GROUND
          = Z - L · cos(α · (p-1)/2 - α · m)

3-DIMENSIONAL COORDINATE ORIGIN IS AT EDGE OF ROAD

Fig. 10

| PROCESS NAME | DESCRIPTION | |
|---|---|---|
| FILLING-UP | 0/1 DATA | 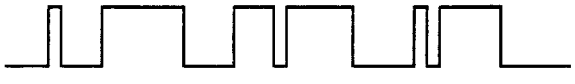 |
| | PROCESSED RESULT | |
| | FILLING UP GAPS LESS THAN OR EQUAL TO A CERTAIN WIDTH PARAMETER EFFECTIVE WHEN THE ROAD SURFACE CAN BE SEEN THROUGH A VEHICLE SUCH AS A MOTORCYCLE | |
| NOISE REJECTION | 0/1 DATA | 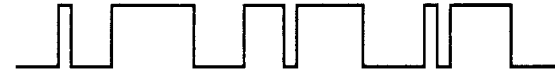 |
| | PROCESSED RESULT | |
| | ELIMINATE SPIKES LESS THAN OR EQUAL TO A CERTAIN WIDTH PARAMETER EFFECTIVE, FOR EXAMPLE, WHEN LITTER FLIES ONTO THE ROAD | |
| WIDTH MAINTAINING | PREVIOUS DATA | 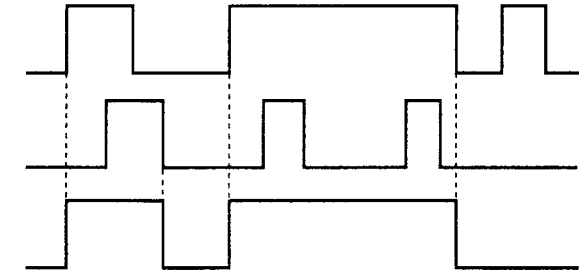 |
| | CURRENT DATA | |
| | PROCESSED RESULT | |
| | PREVIOUSLY PROCESSED RESULT IS MAINTAINED AND, IF THERE IS A '1' IN THE CURRENT DATA WHERE THERE ARE CONSECUTIVE 1's IN THE MAINTAINED DATA, THE '1' IN THE PREVIOUS DATA IS CARRIED OVER TO THE CURRENT DATA | |
| | EFFECTIVE WHEN THE ROAD SURFACE CAN BE SEEN, SUCH AS THROUGH A MOTORCYCLE, OR WHEN THE ROAD SURFACE CAN BE SEEN THROUGH THE FRAME WORK AT THE REAR OF A TRAILER | |

Fig. 11

(2) FILTER INFORMATION CORRECTION

DETECTED VEHICLE DATA STORING SCHEME

```
typedef struct {
    int            status;              VEHICLE STATUS (ENTERING, EXITING, DELETED, CORRECTED)
    unsigned short vehcle_no;           VEHICLE NUMBER
    unsigned short pct_rq;              PICTURING COMMAND
    int            left;                VEHICLE LEFT EDGE
    int            right;               VEHICLE RIGHT EDGE
    unsigned long  line_num;            VEHICLE LENGTH
    int            min_width;           VEHICLE MINIMUM WIDTH
    int            max_width;           VEHICLE MAXIMUM WIDTH
    unsigned long  add_width;           CURRENT TOTAL VEHICLE WIDTH
    unsigned long  add_center;          CURRENT TOTAL VEHICLE CENTER POSITION
    unsigned short passed_time;         VEHICLE PASSAGE TIME
    unsigned short linked_flag;         LINKED FLAG WITH NEXT MEASURED VEHICLE
    int            link_num;            LINKED VEHICLE COUNT WITH PREVIOUS VEHICLE
    int            link_p[VDET_MAX];    LINKED NUMBER WITH PREVIOUS VEHICLE
    unsigned long  main_cmd;            OPERATION COMMAND OF MAIN COMPUTER WHEN ENTERING
    int            min_left;            VEHICLE MINIMUM LEFT EDGE
    int            max_right;           VEHICLE MAXIMUM RIGHT EDGE
} _VDET;

typedef struct {
    int   v_num;                        VEHICLE COUNT
    _VDET det[VDET_MAX];                INDIVIDUAL VEHICLE INFORMATION
} _VDET_DT;

_VDET_DT vdet_now;
```

Fig. 24

```
vdet_now.det[i]. passed_time  = ENTERING TIME RECORD
vdet_now.det[i]. status       = ENTERING
vdet_now.det[i]. pct_rq       = FOR WHEN ENTERING
vdet_now.det[i]. vehcle_no    = VEHICLE NUMBER RECORD
vdet_now.det[i]. min_width    = vdet_now.det[i].right -vdet_now.det[i].left + 1
vdet_now.det[i]. max_width    = vdet_now.det[i].right -vdet_now.det[i].left + 1
vdet_now.det[i]. add_width    = vdet_now.det[i].right -vdet_now.det[i].left + 1
vdet_now.det[i]. add_center   = (vdet_now.det[i].right -vdet_now.det[i].left)/2
vdet_now.det[i]. min_left     = vdet_now.det[i].left
vdet_now.det[i]. max_right    = vdet_now.det[i].right
vdet_now.det[i]. main_cmd     = CURRENT COMMAND RECORD FOR MAIN COMPUTER
```

Fig. 32

| | |
|---|---|
| vdet_now.det[i]. status | = NONE |
| vdet_now.det[i]. vehcle_no | = RECORD VEHICLE NUMBER OF PREVIOUS DATA |
| vdet_now.det[i]. pct_rq | = RECORD PICTURING COMMAND OF PREVIOUS DATA |
| vdet_pre.det[i]. status | = NONE |
| vdet_now.det[i]. line_num | = vdet_pre.det[i]. line_num + 1 |
| vdet_now.det[i]. min_width | = COMPARE WITH PREVIOUS VALUE AND SUBSTITUTE BY SMALLER VALUE |
| vdet_now.det[i]. max_width | = COMPARE WITH PREVIOUS VALUE AND SUBSTITUTE BY LARGER VALUE |
| vdet_now.det[i]. add_width | = PREVIOUS VALUE + CURRENT WIDTH |
| vdet_now.det[i]. add_center | = PREVIOUS VALUE + CURRENT CENTER POSITION |
| vdet_now.det[i]. passed_time | = PREVIOUS VALUE |
| vdet_now.det[i]. min_left | = COMPARE WITH PREVIOUS VALUE AND SUBSTITUTE BY SMALLER VALUE |
| vdet_now.det[i]. max_right | = COMPARE WITH PREVIOUS VALUE AND SUBSTITUTE BY LARGER VALUE |
| vdet_now.det[i]. main_cmd | = SUBSTITUTE PREVIOUS VALUE |

Fig. 33

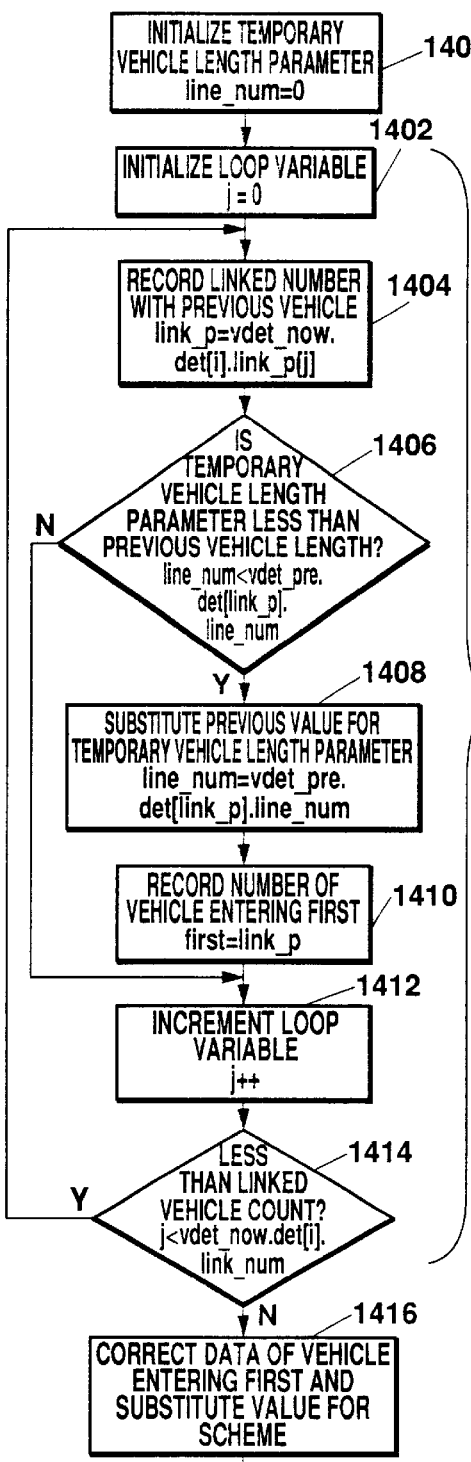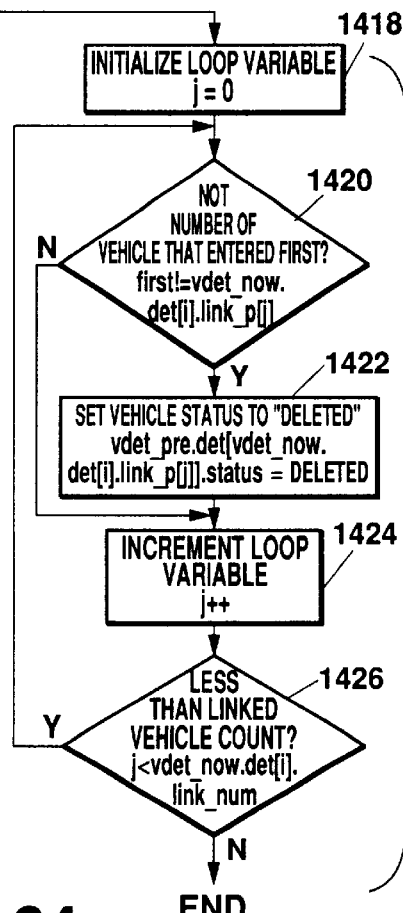
Fig. 34

```
typedef struct {
    unsigned short   vno;             VEHICLE NUMBER
    unsigned char    date;            DATE, TIME
    unsigned short   left;            VEHICLE LEFT EDGE
    unsigned short   right;           VEHICLE RIGHT EDGE
    unsigned short   min_width;       VEHICLE MINIMUM WIDTH
    unsigned short   max_width;       VEHICLE MAXIMUM WIDTH
    unsigned short   mean_width;      VEHICLE MEAN WIDTH
    unsigned short   mean_center;     VEHICLE MEAN CENTER POSITION
    unsigned short   passed_time;     VEHICLE PASSAGE TIME
    unsigned short   reserved[4];     RESERVED AREA
} _DETECT;
```

Fig. 35

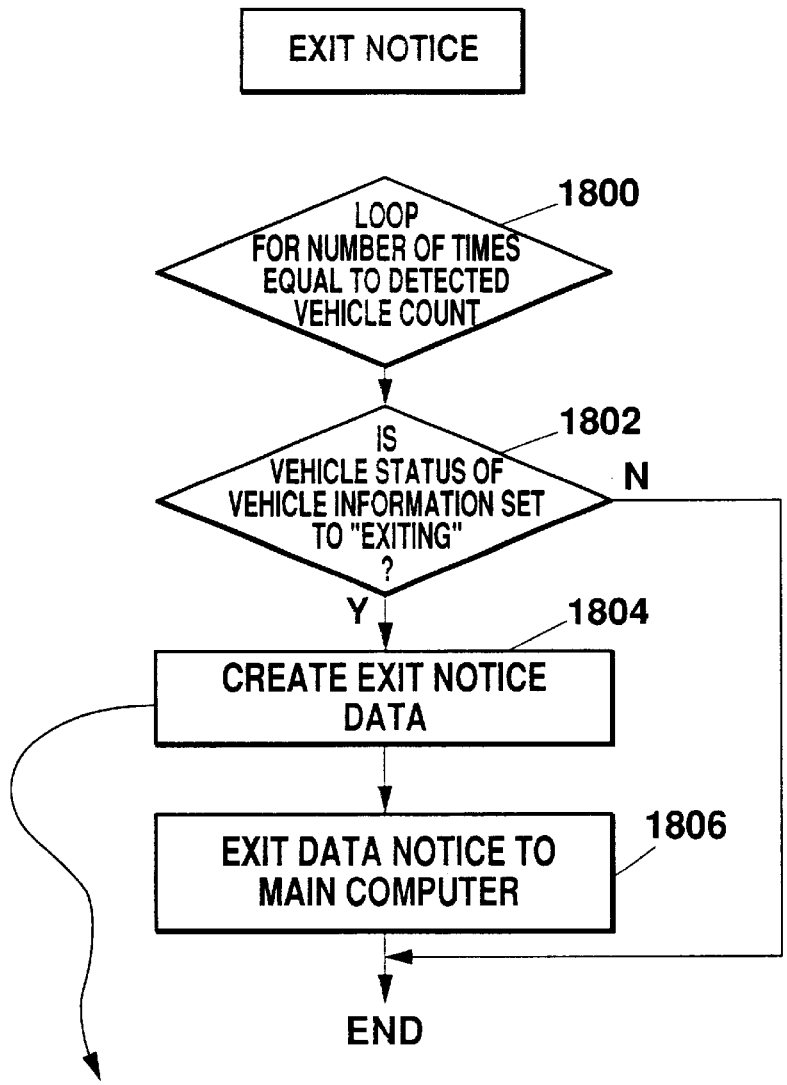

```
ddet = (_DETECT   *)&vdet_com_buf[8]

ddet->vno       = vdet_pre. det[ i ].vehcle_no;
memcpy( (char   *)ddet->date, (char *)&status_link_rdt[0][2], sizeof(ddet->date)-1 );
ddet->date[7]   = 0;
ddet->left      = vdet_pre. det[ i ].min_left;
ddet->right     = vdet_pre. det[ i ].max_right;
ddet->min_width = vdet_pre. det[ i ].min_width;
ddet->max_width = vdet_pre. det[ i ].max_width;
ddet->mean_width = vdet_pre. det[ i ].add_width/vdet_pre. det[ i ]. line_num;
ddet->mean_center = vdet_pre. det[ i ].add_center/vdet_pre. det[ i ]. line_num;
ddet->passed_time = vdet_time_stop( vdet_pre. det[ i ]. passed_time );
err = hdi_com_snd( MAIN_BLK, 2, (byte *)c, (dword)(sizeof(_COMHEAD)+
    sizeof(_DETECT)), DETECT_TASK );
}
```

Fig. 39

PICTURING INFORMATION OF VEHICLES
```
typedef struct {
    unsigned short  vno;           VEHICLE NUMBER
    unsigned char   start_cam_no;  PICTURING START CAMERA NUMBER
    unsigned char   end_cam_no;    PICTURING END CAMERA NUMBER
} _V_PCT_INF;

typedef struct {
    unsigned long   pct_bit;       PICTURING BIT PATTERN
    unsigned short  vpct_num;      PICTURING VEHICLE COUNT
    _V_PCT_INF      vpct[20];      VEHICLE PICTURING INFORMATION
} _V_PCT_INF;
```

Fig. 40

MOVING OBJECT DETECTION METHOD AND APPARATUS

BACKGROUND OF THE INVENTION

1. Field of the Invention

The present invention relates to a moving object detection method and apparatus for detecting moving objects, such as vehicles, using remote sensing techniques.

2. Description of the Prior Art

In a known system that debits tolls against vehicles traveling a toll road (refer to Japanese Patent Laid-Open Publication No. Hei 4-34684), the entering of a vehicle into a tollgate is optically detected, a toll bar is lowered at the exit of the gate at least until payment of the toll, and the toll bar is raised after confirmation of the toll payment. The greatest disadvantage of this system is that gates must be provided.

SUMMARY OF THE INVENTION

One motive of the present invention lies in solving the above-mentioned problem of the conventional system while another lies in improving some of the functions of an automatic debiting system (referred to as a "previously proposed system") proposed earlier by the assignee of the present application in Japanese Patent Application No. Hei 7-82523 and its corresponding U.S. patent application Ser. No. 08/661,703 now U.S. Pat. No. 5,602,395.

Solving the problem of the previously proposed system, which is the first motive, has already been achieved in the previously proposed system. In the previously proposed system, a gantry spanning a road is provided, and debiting against vehicles and debiting confirmation are executed through radio communications between antennas installed on the gantry and in-vehicle units (IU) in vehicles. Therefore, in the previously proposed system, it is not necessary to provide gates, thus resulting in such advantages as reductions in facility installations and maintenance costs, and prevention of traffic bottlenecks by allowing free lane travel. Furthermore, in operating an automatic debiting system, it is necessary to manage the system so that debiting is performed fairly against all vehicles traveling on the road. In the previously proposed system, steps can be taken to detect vehicles, such as those not carrying an IU, those carrying an IU for another vehicle type, or those for which payment was insufficient (collectively referred to hereinafter as illegal vehicles), and photograph their license plates. In this respect, the system management based on the above-mentioned object is satisfied. One method that is particularly effective in this respect among the various characteristic configurations in the previously proposed system is to detect vehicles using remote sensing techniques, and based on the result compared with that of debiting and debiting confirmation, to detect the various types of illegal vehicles. Specifically, the previously proposed system proposes a method for detecting positions where vehicles are located along a direction traversing the road, and to provide information, such as their detected positions (referred to hereinafter as "detected vehicle positions") and their sizes (vehicle widths), for comparison with results such as debiting.

One point that must be taken into account when detecting, for example, the positions of vehicles along the direction traversing the road is false detection caused by any of a variety of factors. For example, if various types of noise (including factors caused by an operation or performance of vehicle detection devices, factors caused by interference among vehicle detection devices, and factors caused by environmental conditions of rain, snow, light, temperature, dirt, birds, and so forth) are generated during detection, false detection may result, such as objects other than vehicles being detected as vehicles or a single vehicle being detected as multiple vehicles. Furthermore, if an attempt is made to detect the positions of vehicles at a high resolution, for example, the likelihood of an above-mentioned noise-induced false detection generally increases and other errors become probable, for example, the detection of part of a vehicle, such as the angle or framework of a trailer's rear, a mirror protruding from the side of a vehicle, or the outline of a vehicle having a complex profile in the horizontal plane, as second vehicle. Furthermore, when multiple vehicles travel side by side in close proximity to each other, it is also possible for these vehicles to be falsely detected as a single vehicle.

One object of the present invention lies in reducing or preventing false detection when detecting moving objects, such as vehicles, with sensors, such as distance sensors, by processing the positional information obtained from the concerned sensors using the profiles, movements, and so forth, of the moving objects.

A first aspect of the present invention is a moving object detection method and a second aspect is a moving object detection apparatus. In the first aspect, a process for detecting the existence of moving objects at multiple positions on a predetermined line by scanning on the concerned line, and a process for filtering moving object existence information obtained from this detection with filtering characteristics determined according to essential profiles of the moving objects and/or to moving object information obtained in a previous period are executed periodically. In the second aspect, the existence of moving objects at multiple positions on a predetermined line is periodically detected by scanning on the concerned line with sensors, and the moving object existence information obtained from the sensors at a certain period is filtered with filtering characteristics determined according to essential profiles of the moving objects and/or moving object information obtained in the previous period.

In the present invention, the original moving object existence information obtained from scanning and detecting on the line comprises information indicating whether or not a moving object exists at certain positions on the line. The original moving object existence information usually is susceptible to the effects of various types of noise, parts of vehicles (such as mirrors), moving conditions of the moving objects (such as traveling side by side), and so forth. Therefore, if the original moving object existence information is used as is, conditions, namely, false detection, may occur where the obtained information indicates with regard to a certain position, "a moving object exists" even though moving objects do not actually exist at that position (or should not be considered to exist), or "a moving object does not exist" even though a moving object actually exists at that position (or should be considered to exist). The moving object existence information is filtered in the present invention to reduce the risk of false detection caused by the effects of various types of noise.

In the present invention, the filtering characteristics for use when filtering the moving object existence information are determined, for example, according to the essential profiles of moving objects. If the moving object existence information is filtered with filtering characteristics determined according to the relevant information, it becomes possible, from viewing the essential profile of a moving object, to correct the information when it was obtained indicating "a moving object exists" at a position where it should originally be "a moving object does not exist" to information indicating "a moving object does not exist," and conversely, to correct the information when it was obtained indicating "a moving object does not exist" at a position where it should originally be "a moving object exists" to information indicating "a moving object exists." Or, the filtering characteristics in the present invention may be determined according to the moving object existence information that was obtained in a previous period. If the moving object existence information is filtered with filtering characteristics determined according to the relevant information, it becomes possible, from viewing the continuity that should be maintained with the moving object existence information in a previous period, to correct the information when it was obtained indicating "a moving object exists" at a position where it should originally be "a moving object does not exist" to information indicating "a moving object does not exist," and conversely, to correct the information when it was obtained indicating "a moving object does not exist" at a position where it should originally be "a moving object exists" to information indicating "a moving object exists." In the present invention, these principles reduce the risk of false detection caused by various types of noise, for example, and achieve more precise moving object detection.

The present invention includes various preferred embodiments related particularly to bases for setting the filtering characteristics.

In a first preferred embodiment, when multiple positions (former) for which moving object existence information has been obtained indicating "a moving object exists" are less than or equal to a predetermined number of positions (latter) for which moving object existence information has been obtained indicating "a moving object does not exist," the filtering characteristics were made to include a filling-up characteristic for correcting the contents of the moving object existence information in the latter to "a moving object exists." In this embodiment, the filtering characteristics have been determined according to the essential profiles of moving objects, particularly a relative position where "a moving object exists" cannot be detected, namely, a profile having a gap. Therefore, if an attempt is made to detect a moving object having a gap when viewed from above, such as a motorcycle, a false detection of multiple moving objects due to the gap is less likely to occur.

In a second preferred embodiment, when multiple positions (former) for which moving object existence information has been obtained indicating "a moving object does not exist" include a predetermined number or less of positions (latter) for which moving object existence information has been obtained indicating "a moving object exists," the filtering characteristics were made to include a noise rejection characteristic for correcting the contents of the moving object existence information in the latter to "a moving object does not exist." In this embodiment, a lower limit exists in the essential profiles of moving objects, particularly in a dimension along the direction of the line, thus, the filtering characteristics have been determined according to a property where moving object existence information indicating "a moving object exists" is hardly generated with regard to a small number of positions, or, isolated positions. Therefore, as an example, false detection of litter flying onto the road as a moving object becomes unlikely.

In a third preferred embodiment, when moving object existence information indicating "a moving object exists" has been obtained with regard to a larger predetermined number or greater of mutually adjacent positions, the filtering characteristics were made to include a maximum width checking characteristic for correcting the contents of the moving object existence information in positions selected at an interval of a smaller predetermined number from a predetermined number or greater of positions to indicate "a moving object does not exist." In this embodiment, by utilizing the fact that in general an upper limit exists in the essential profiles of moving objects, particularly in a dimension along the direction of the line, the filtering characteristics have been determined according to a property where moving object existence information indicating "only one moving object exists" is not generated with regard to an extremely large number of mutually adjacent positions. Therefore, for example, false detection of multiple moving objects traveling side by side without sufficient space to be detected separately becomes unlikely.

In a fourth preferred embodiment, when mutually adjacent multiple positions (former) for which moving object existence information has been obtained indicating "a moving object exists" in a previous period and mutually adjacent positions (latter) for which moving object existence information has been obtained indicating "a moving object exists" in a recent period are at least partially overlapping, the filtering characteristics were made to include a width maintaining characteristic for correcting the contents of the moving object existence information in the recent period at positions included in the former and not included in the latter to indicate "a moving object exists." In this embodiment, the filtering characteristics have been determined according to a continuity that should be secured with the moving object existence information obtained in a previous period, namely, a logical requirement where a dimension along the direction of the line should be maintained when the dimension has been obtained in the previous period. Therefore, for example, when an attempt is made to detect along the line a moving object having a gap as viewed from above, such as a motorcycle, false detection of one moving object as multiple moving objects due to the gap becomes unlikely, or when an attempt is made to detect along the line a moving object, such as a trailer having a framework at its rear portion, false detection of one moving object as multiple moving objects due to the framework becomes unlikely to occur.

In a fifth preferred embodiment, when moving object existence information has been obtained indicating "a moving object does not exist" in a recent period with regard to positions for which moving object existence information has been obtained indicating "a moving object exists" in a previous period, the filtering characteristics were made to include a delaying characteristic for correcting the contents of the moving object existence information in the recent period at the positions to indicate "a moving object exists." In this embodiment, the filtering characteristics have been determined according to the continuity and the complexity of moving object profiles which were taken into account in the fourth preferred embodiment. Therefore, even when sensing is unstable, for example, due to a moving object having a complex profile, false detection of a moving object's dimension becomes unlikely.

In a sixth preferred embodiment, when moving object existence information indicating "a moving object exists" has not been obtained at a predetermined or greater frequency in multiple past periods with regard to a number of all mutually adjacent positions for which moving object existence information was obtained indicating "a moving object exists" in a recent period, the filtering characteristics were made to include a Y character profile prevention characteristic for correcting the contents of the moving object existence information at the multiple positions to indicate "a moving object exists." In this embodiment, the filtering characteristics have been determined according to the essential profiles of the moving objects, particularly the complexity of their front ends, and the moving object existence information in multiple past periods. Therefore, for example, false detection, such as of a dimension, becomes unlikely, even for moving objects having complex front end profiles.

There are various preferred embodiments in the present invention in addition to the above, particularly with regard to filtering sequences.

In a seventh preferred embodiment, after the filling-up process in the first preferred embodiment and/or the noise rejection process in the second preferred embodiment, the width maintaining process in the fourth embodiment, the Y character profile prevention process in the sixth embodiment, the delaying process in the fifth embodiment and/or the maximum width checking process in the third embodiment are executed. According to this embodiment, causes of false detection (such as flying litter or other causes) related only to a comparatively small number of positions are first eliminated by the filling-up process and/or the noise rejection process, then causes of false detection (such as complexity of moving object profiles and moving object traveling states) related to a comparatively large number of positions are next eliminated by the width maintaining process, the Y character profile prevention process, the delaying process and/or the maximum width checking process. Therefore, compared to a case where these processes are executed in reverse sequence, the preventive effect of false detection is greater with the width maintaining process, the Y character profile prevention process, the delaying process and/or the maximum width checking process.

In an eighth preferred embodiment, after the width maintaining process in the fourth embodiment, the Y character profile prevention process in the sixth embodiment is executed. According to this embodiment, after a dimension along the line with regard to a comparatively detailed moving object profile was maintained in the width maintaining process, the Y character profile prevention process, which used the width information, is performed so that the effect of the Y character profile prevention process is further enhanced.

In a ninth preferred embodiment, after the filling-up process in the first embodiment, the noise rejection process in the second embodiment, the width maintaining process in the fourth embodiment, the Y character profile prevention process in the sixth embodiment and/or the delaying process in the fifth embodiment, the maximum width checking process in the third embodiment is executed. According to this embodiment, after the number of mutually adjacent positions providing moving object existence information indicating "a moving object exists" expands, the maximum width checking process is executed to enable multiple moving objects to be comparatively accurately separated and detected.

BRIEF DESCRIPTION OF THE DRAWINGS

FIG. 10 is a conceptual drawing showing a height information generation principle.

FIG. 11 is a timing chart conceptually showing operations of a filling-up process, a noise rejection process, and a width maintaining process in vehicle detection preprocessing.

FIG. 24 is a listing showing the contents of a detected vehicle data storing scheme.

FIG. 32 is a listing showing the contents of entering vehicle data.

FIG. 33 is a listing showing the contents of existing vehicle data.

FIG. 34 is a flowchart showing a procedure for a corrected/deleted vehicle data creation process in vehicle information creation processing.

FIG. 35 is a listing showing the contents of a detected vehicle data notice scheme.

FIG. 39 is a flowchart showing a procedure for the exit notice process in a narrow sense in the exit notice process.

FIG. 40 is a listing showing the contents of a picturing command notice scheme.

DETAILED DESCRIPTION OF THE PREFERRED EMBODIMENTS

Preferred embodiments of the present invention will be described in the following with reference to the accompanying drawings. The description here deals mainly with a vehicle detection system relating to the embodiments of the present invention. Descriptions of an antenna system for executing radio communications relating to debiting and debiting confirmation with vehicle mounted IUs, and of a host system for executing detection of illegal vehicles, for example, based on information obtained by the antenna system and vehicle detection system are omitted. For details on the antenna system and host system, refer to Japanese Patent Application No. Hei 7-82523 and its corresponding U.S. Patent Application that were assigned to the same assignee as this patent application. Furthermore, the present invention may be implemented in any location where moving objects can move, so its implementation is thus not restricted to roads. Also the direction of the scanning detection of moving object existence should not be construed as being restricted to a direction traversing a road. Any direction is acceptable as long as it intersects with the advancing direction of the moving objects. The objects to be detected in the present invention apply to any objects that move, and are thus not restricted to vehicles. The moving object detection method in the present invention applies to any remote detection method, so should not be restricted to optical detection methods. Additionally, the original purpose of developing this invention was to improve some of the functions of the prior art system. However, any application of the vehicle detection system relating to the present invention should not be restricted only to automatic debiting systems.

a) System Configuration

Figure 1:
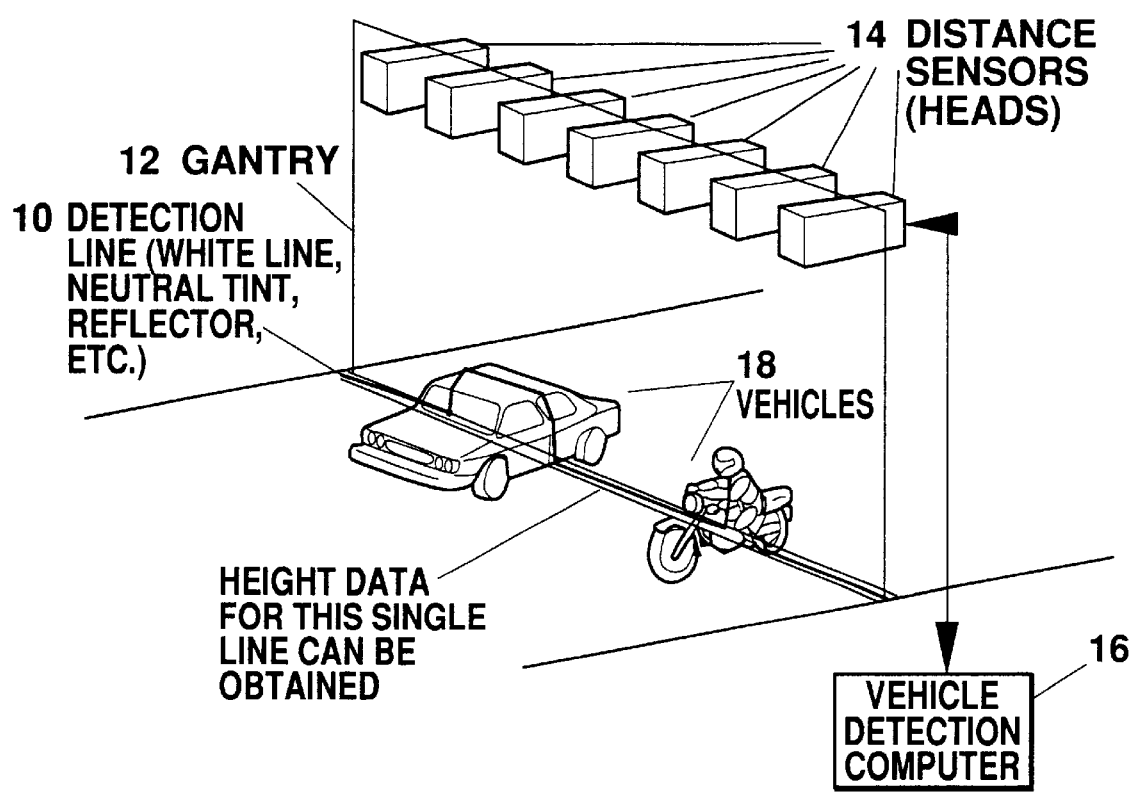
FIG. 1 is a perspective view showing a general configuration of a system related in the first embodiment of the present invention.

FIG. 1 shows a general external appearance of a vehicle detection system relating to an embodiment of the present invention. First of all, in this figure, a detection line 10 that traverses a road, and a gantry 12 that spans the road are provided. Multiple distance sensors (or heads) 14 are arranged side by side on gantry 12. Each head 14 detects and measures a distance to an object (such as a vehicle 18) in the direction of detection line 10 based on the principle of triangulation, and supplies an analog voltage expressing the obtained distance to a vehicle detection computer 16 shown on the side of the road.

Figure 2:
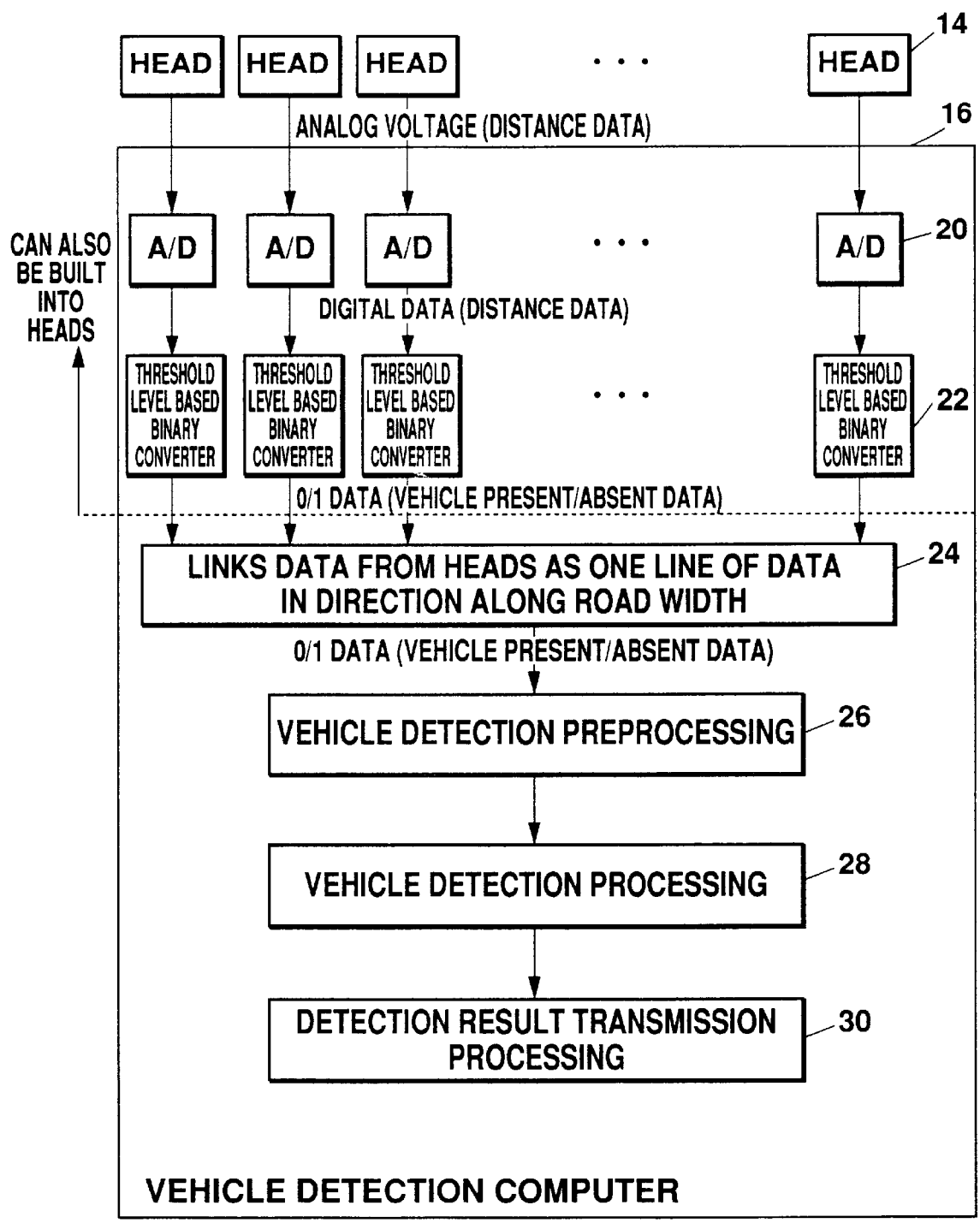
FIG. 2 is a block diagram showing a functional configuration of a vehicle detection computer.

As shown in FIG. 2, the vehicle detection computer 16 has AID converters 20 and binary converters 22 provided to correspond to heads 14. Each A/D converter 20 converts an analog voltage supplied from the corresponding head 14 into digital distance data, and each binary converter 22 converts the distance data obtained from the corresponding A/D converter 20 into a binary value by comparing it with a predetermined threshold level. The A/D converters 20 and binary converters 22 may be built into the corresponding heads 14.

The vehicle detection computer 16 includes a linkage generator 24, a vehicle detection preprocessor 26, a vehicle detector 28, and a detection result transmission processor 30. Linkage generator 24 links the 0/1 data obtained from binary converters 22, namely, the data indicating the existence of moving objects nearly directly below corresponding heads 14, along detection line 10, and generates linked 0/1 existence data indicating the existence of moving objects along detection line 10. Since moving objects move with the elapse of time and also cause the detection results of heads 14 to change with time, linkage generator 24 executes linking each time a detection operation is executed for each position on detection line 10 by a coordinated operation of all heads 14, namely, each time detection line 10 is scanned once. Based on the linked 0/1 existence data obtained periodically in this manner, vehicle detector 28 detects vehicle width, mean center, right edge, left edge, time entering, time exiting, time required for passing detection line 10, and so forth for each vehicle 18. Detection result transmission processor 30 transmits the required information from among the information obtained from vehicle detector 28 or obtained after processing them to a host system.

The greatest characteristic of this embodiment lies in the operation of vehicle detection computer 16, particularly in the vehicle detection preprocessing (filtering) to be performed on the linked 0/1 existence data by vehicle detection preprocessor 26, and in the operation of vehicle detector 28 based on the results of vehicle detection preprocessing. Prior to describing these operations, measurement operation by heads 14, an AID conversion by A/D converters 20, binary conversion (encoding) by binary converters 22, and 0/1 data linkage generation by linkage generator 24 are described using actual examples to facilitate the understanding of the present invention.

b) Overview of Distance Measurement

This embodiment uses, for heads 14, active optical distance sensors for detecting distances to moving objects (such as vehicles 18) in the direction of detection line 10 by optical axes realized by LEDs (Light Emitting Diodes) and PSDs (Position Sensing Devices), namely, sensors emitting light and detecting the reflected light, such as from vehicles 18. Detection line 10 comprises a material that enables optical triangulation by each head 14 to be reliably executed, and is designed to provide nearly identical reflectance from all relative positions. Examples include white or neutral tint paint or reflectors, although it may be realized with other materials. Since this type of sensor is used, distance measurements can be executed according to this embodiment both night or day in any weather. Unlike configurations for detecting the existence of vehicles 18 on a road by photographing the road surface using a CCD camera, for example, it is not necessary to perform automatic exposure correction so the cost of implementation and maintenance decreases. If the road surface provides a nearly constant reflectance, detection line 10 need not be a painted line or a reflector and may simply be a conceptual line.

Figure 3:
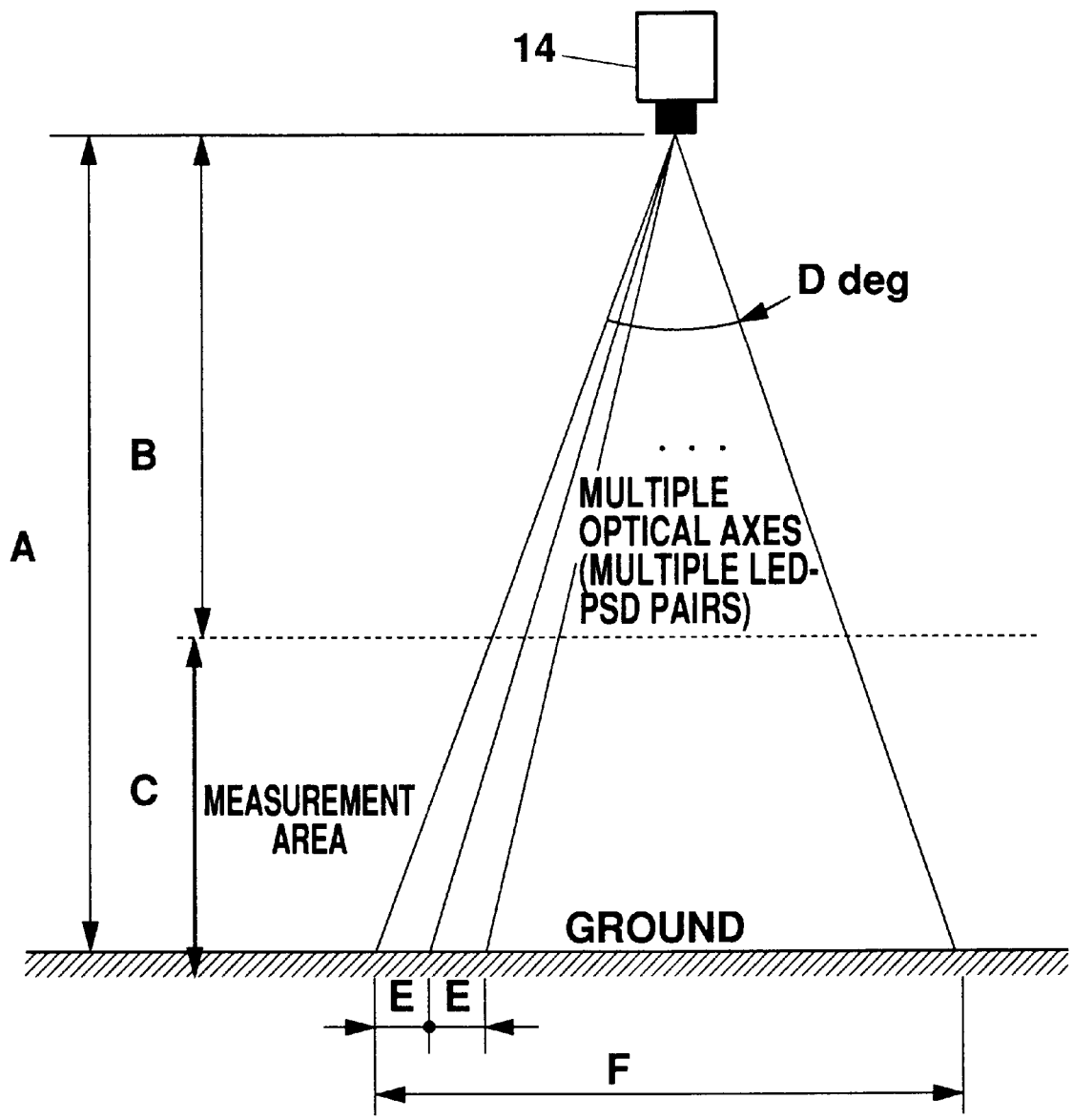
FIG. 3 is an arrangement drawing for describing a scanning function of each head.

In this embodiment, heads 14 are arranged at a height A [mm] from the road surface so as to be sufficiently higher, for example, than the roofs of large trucks (refer to FIG. 3). Setting the height of heads 14 in this manner sufficiently high can prevent heads 14 from obstructing the travel of vehicles 18 on the road.

Figure 4:
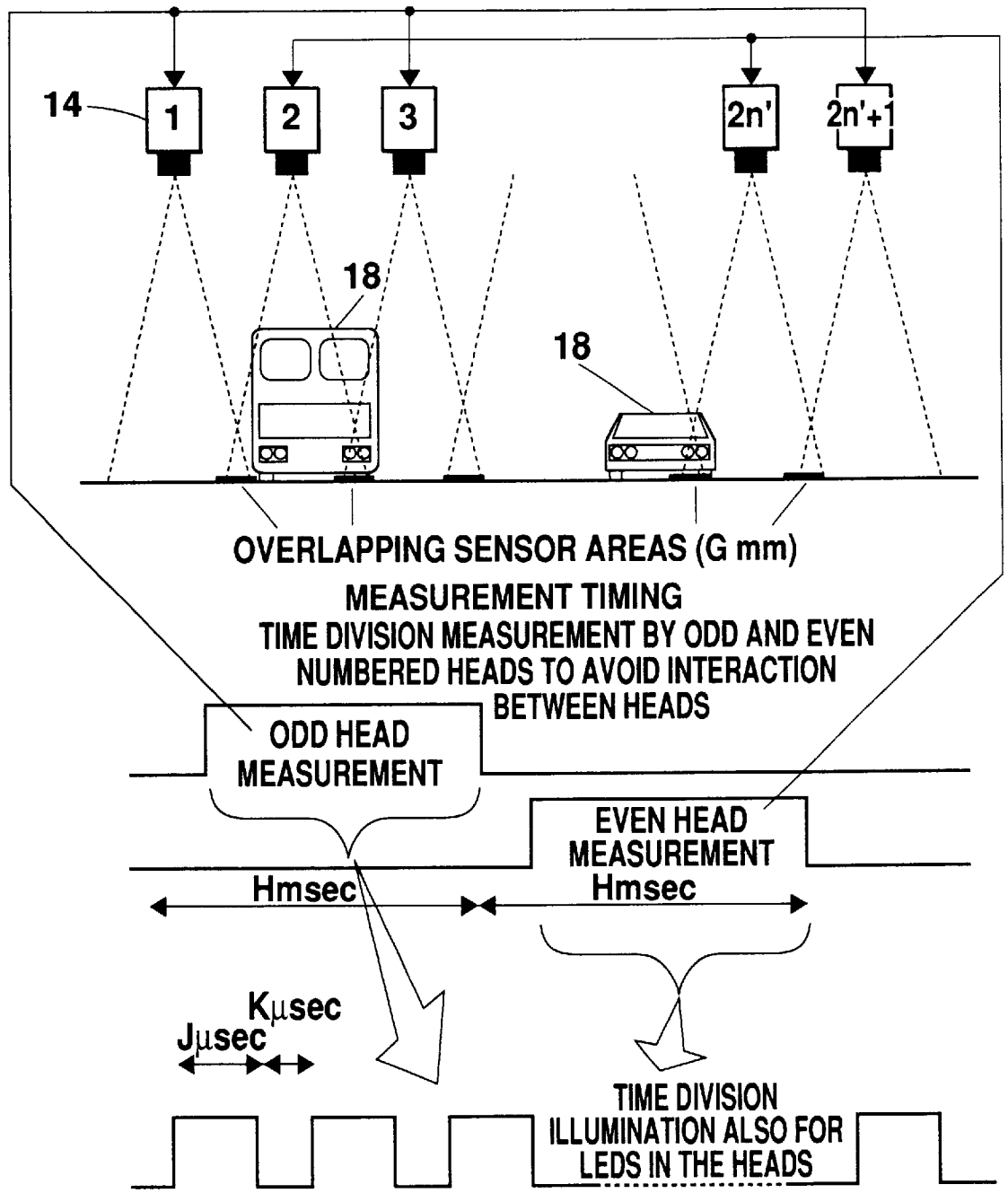
FIG. 4 is a timing chart describing a time division operation of each head and a time division operation of each LED.

In this embodiment, heads 14 are arranged at an interval where measurement areas of mutually adjacent heads 14 in the direction of detection line 10 partially overlap (refer to FIG. 4). Therefore, for each sensor overlapped area G (mm) shown as heavy lines in the figure, the distance to vehicle 18 existing in the area can be measured by either of the two heads 14 having the area as part of their measurement areas. However, if contention for measurement, namely, simultaneous measurement, occurs with respect to a sensor overlapped area by two heads 14 having the same area as part of their measurement areas, the outputs of these heads 14 may introduce an error. Thus, the odd numbered heads 14 and the even numbered heads 14 in this embodiment are actuated in a time division scheme at a period of H (ms). If the operation time division period H between heads 14 is sufficiently short, detection line 10 can be scanned in a sufficiently short time. A control device not shown, for example, a control device built into heads 14, executes control operations relating to this time division drive. Furthermore, it is not necessary to divide the heads 14 into two groups for the time division operation, such as odd numbered heads and even numbered heads, and from a design point of view, the heads 14 may be divided into three or more groups for operation in time division (as long as adjacent heads 14 do not operate simultaneously).

Each head 14 further has multiple optical axes (refer to FIG. 3). Lengths E [mm] in the figure represent road surface projection widths of the measurement areas of each optical axis in the direction of detection line 10, and length F (mm) represents a total of the widths for one head 14, namely, a road surface projection width of the measurement area in the direction of detection line 10 for one head 14. The measurement area in the direction of detection line 10 extends across an angular range D (deg) including a direction perpendicular to the road surface. In this manner, each head 14 provides multiple optical axes so that the number of structures on gantry 12 can be reduced while maintaining the measurement resolution in the direction of detection line 10 at a precise value. This advantage becomes further evident in combination with the vehicle detection preprocessing to be described later. Furthermore, by executing the time division operation also within individual heads 14 so that a light projection device (such as an LED) relating to a certain optical axis illuminates for a period J ($\mu$s), then after the elapse of a period K ($\mu$s), a light projection device relating to another optical axis illuminates (refer to FIG. 4), mutual contention among measurement operations by the optical axes can be prevented. This control operation is executed, for example, by a control apparatus built into each head 14.

A measurement area C [mm] of each head 14 in a direction perpendicular to the road surface is set to an area including the road surface as well as including a height higher than the heights of vehicles 18. As shown in FIG. 3, the measurement area C [mm] in the direction perpendicular to the road surface is restricted to an area narrower than the installation height A of head 14 in this embodiment to raise the precision of distance measurement by each head 14 and to limit dispersion in the measurement results.

c) Overview of A/D Conversion-linkage Generation

Figure 5:
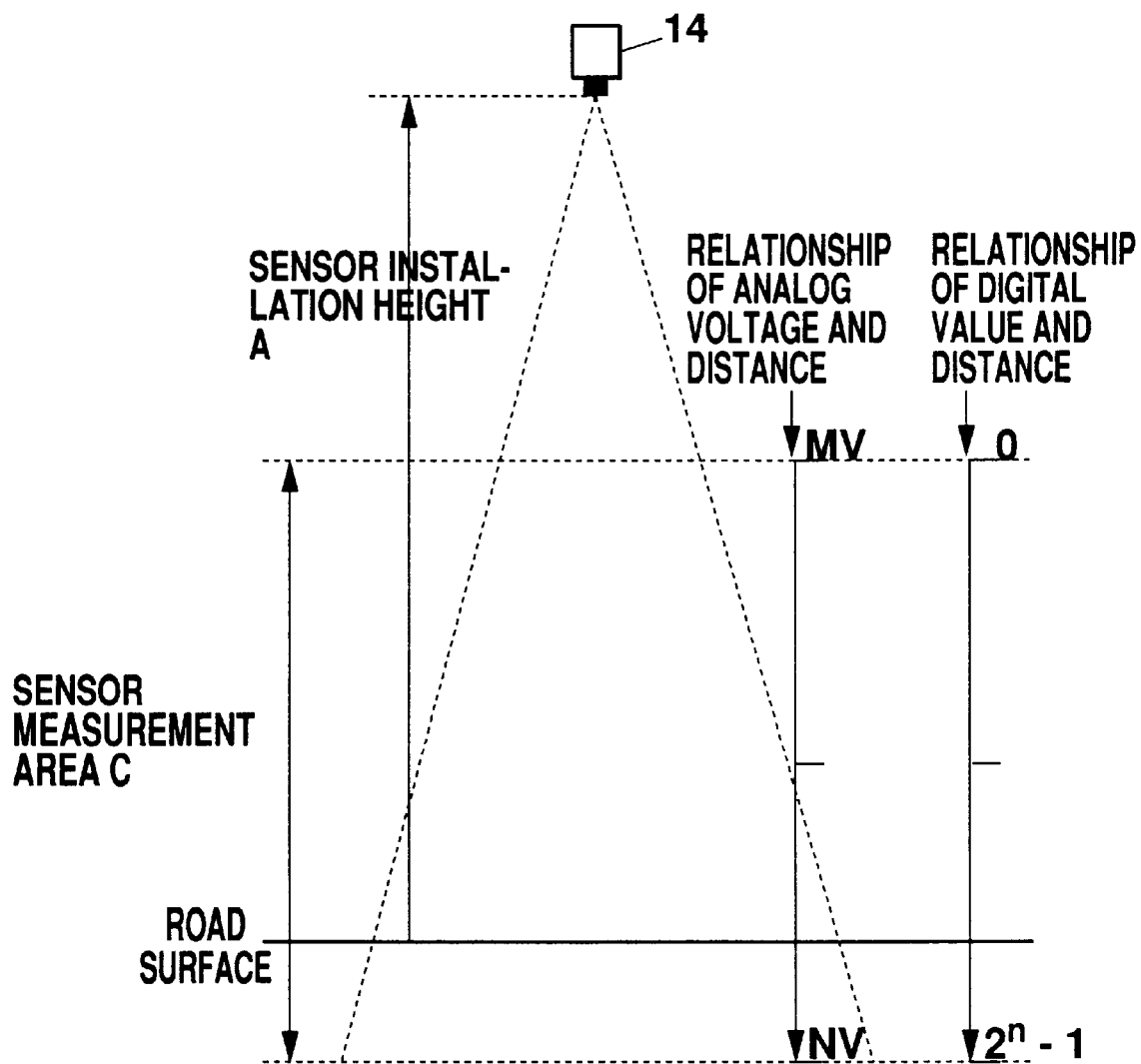
FIG. 5 is an arrangement drawing for describing the contents of distance data.
Figure 6:
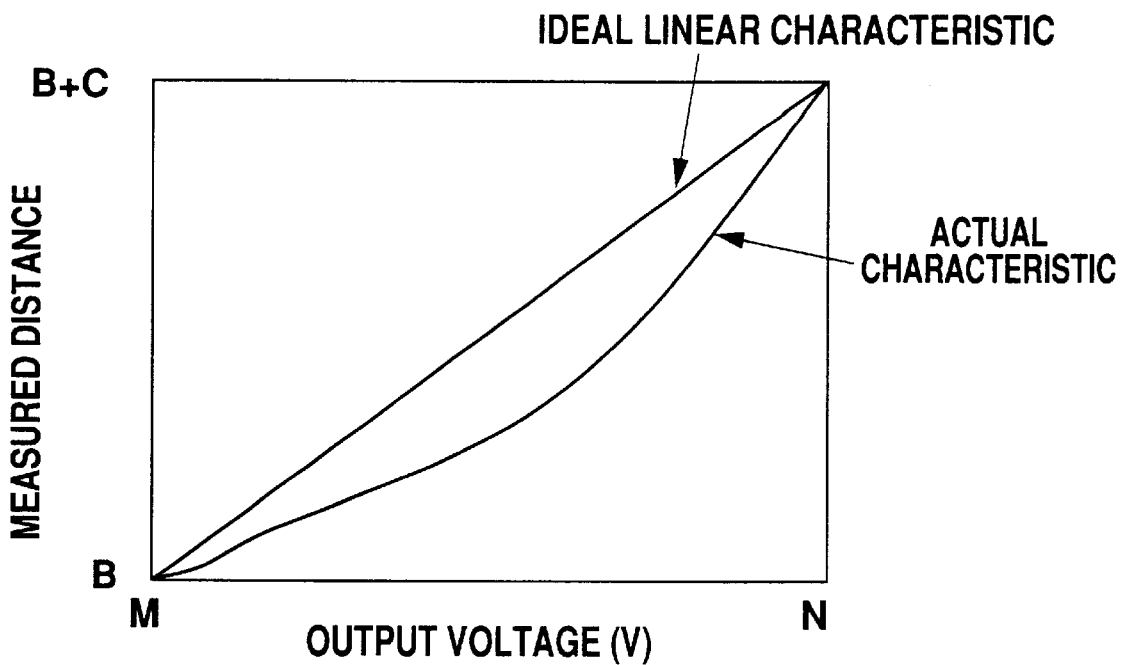
FIG. 6 shows output voltage versus distance characteristics for each head.

FIG. 5 shows a relationship between measurement area C of each head 14 in the direction perpendicular to the road surface, an output voltage of head 14, and an output of the corresponding A/D converter 20. In this figure, it is assumed the output characteristic of each head 14 is nearly linear with respect to the actual distance as shown in FIG. 6. In other words, it is assumed here that head 14 outputs a minimum output voltage M (V) when the detected optical level of the reflected light is less than or equal to a predetermined lower limit level, and conversely outputs a maximum output voltage N (V) when the detected optical level is greater than or equal to a predetermined upper limit level. If some reflecting surface is at a relative position higher than the upper edge of measurement area C (such as vehicle 18 having an extremely high vehicle height), a light ray from the LED will be reflected in a direction that cannot be detected by the PSD so that the output voltage of head 14 becomes M (V). Also, if a refracting or diffusing surface (such as a window or lens) is within measurement area C, the light ray from the LED will be reflected similarly in a direction that cannot be detected by the PSD so that the output voltage of head 14 becomes M [V]. Furthermore, if the road surface has an extremely deep hole so that the light ray from the LED is attenuated, the detected light level at the PSD lowers so that the output voltage of head 14 becomes M (V).

Each A/D converter 20 performs A/D conversion on the output voltage of the corresponding head 14 to generate distance data having n bits (n: natural number). However, in practice, as shown in FIG. 6, the "actual characteristic" of head 14 fails to follow the "ideal linear characteristic" due to cost and other reasons. Therefore, when generating distance data, each A/D converter 20 converts the output voltage of the corresponding head 14 or a digital value obtained after A/D conversion on the output voltage, to a linear voltage or digital value with respect to distance by a table storing the characteristic of FIG. 6. This method facilitates the handling of distances to objects (such as vehicles 18) on roads and of the existence of the objects in the processes starting from vehicle detection preprocessor 26 in FIG. 1. Although another method, such as a conversion formula, may be used instead of the table, the use of a table is generally the easiest method.

Figure 7:
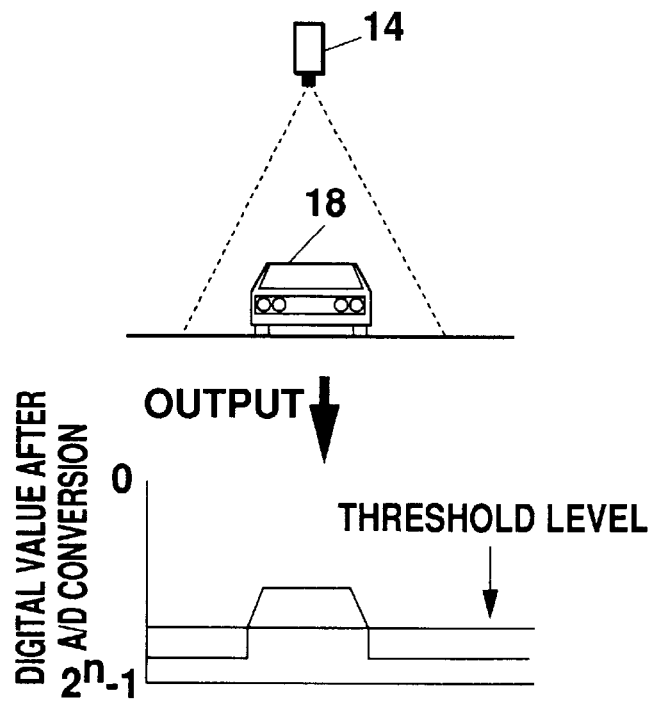
FIG. 7 is a conceptual drawing showing a threshold level setting method for flat road surfaces.
Figure 8:
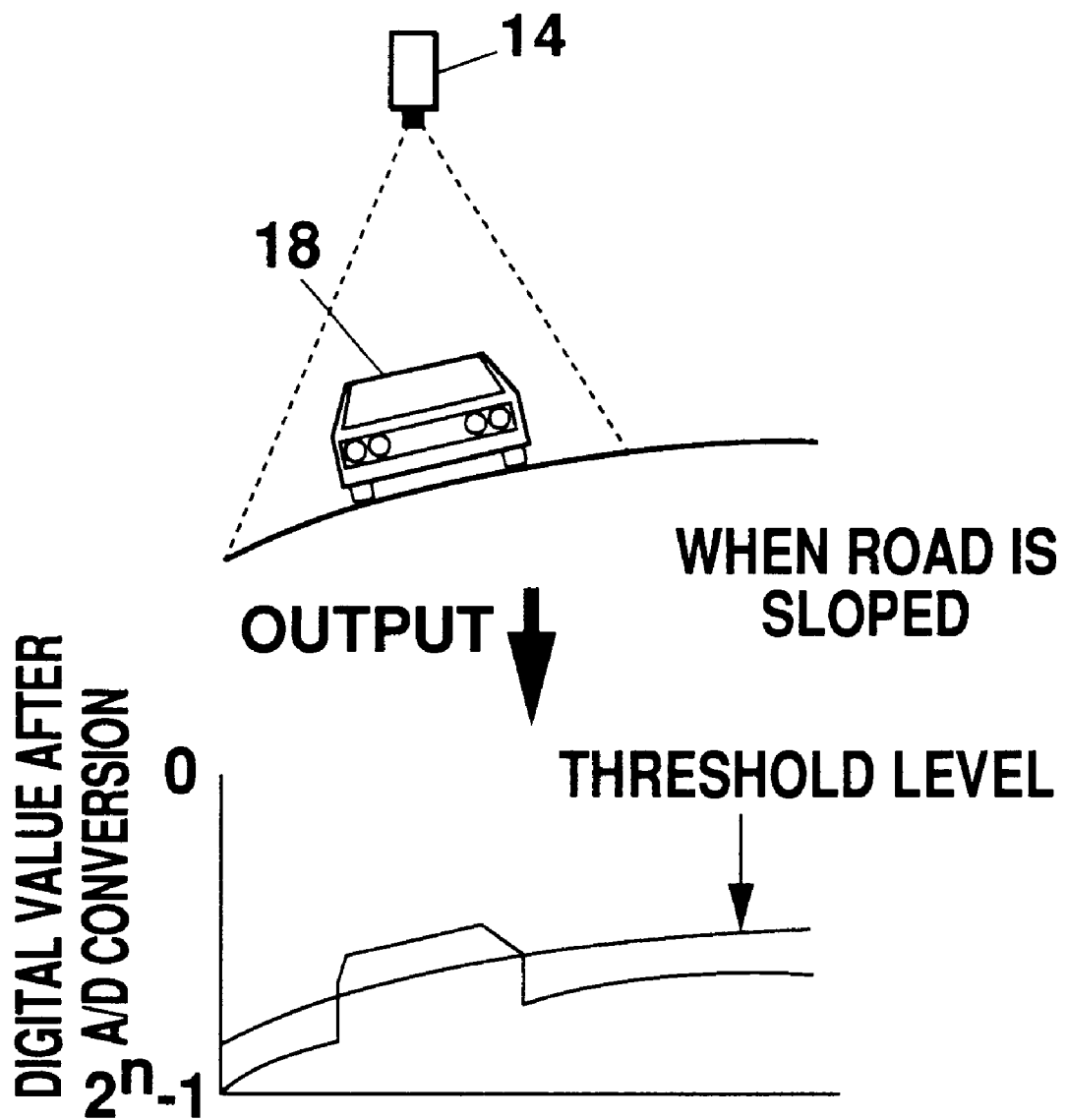
FIG. 8 is a conceptual drawing showing a threshold level setting method for transversely sloped road surfaces.

Each binary converter 22 performs binary conversion on the distance data from the corresponding A/D converter 20. As shown in FIG. 5, for example, in an n-bit quantization performed by A/D converter 20 where the minimum output voltage M (V) of head 14 becomes equivalent to 0 and the maximum output voltage N (V) becomes equivalent to $2^n-1$, a value of 0 is output when the distance data from A/D converter 20 is larger than a threshold level and a value of 1 is output when the distance data is less than the threshold level. The 0/1 data obtained in this manner has a value of 1 when an object, such as vehicle 18, is present, or a value of 0 when the object is not present. If the road surface is nearly flat, as shown in FIG. 7, the threshold levels used in binary converters 22 are set to values determined, for example, by the reflectance of detection line 10, and the same value may be used for every binary converter 22. However, actual roads have gradients, such as those due to slopes or corners, or have a cross-sectional shape showing a rise at the center, such as for water drainage. All of these road surface shapes influence the output voltages of heads 14 and the output values of A/D converters 20. To cope with this, the threshold level at each binary converter 22 is set in this embodiment according to the gradient of the road surface as shown in FIG. 8 so that a different threshold level is used for each head 14 or for each optical axis.

Figure 9:
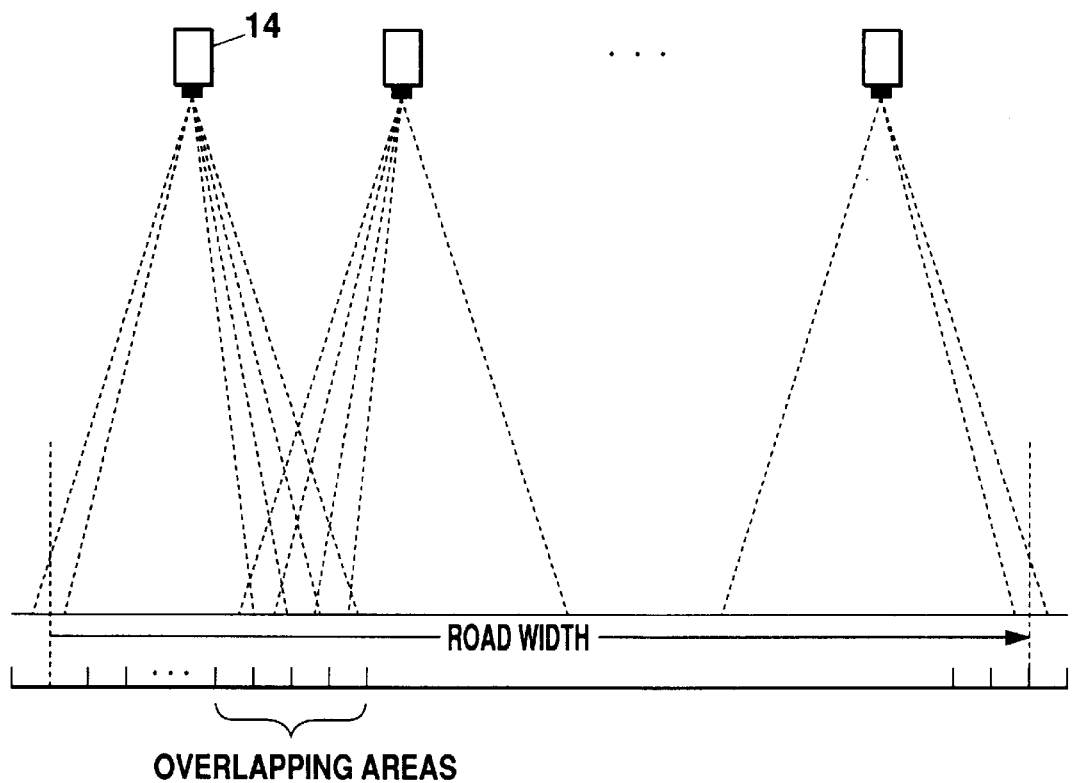
FIG. 9 is an arrangement drawing for describing the 0/1 data count and the linking principle.

The 0/1 data bits obtained from the above-mentioned binary conversions are linked along detection line 10 by linkage generator 24 each time detection line 10 is scanned once. The linked 0/1 existence data bits obtained as a result form a bit string of several consecutive values of 1 at relative positions where objects, such as vehicles 18, exist. The relevant bit string facilitates the processes starting from vehicle detection preprocessor 26. During linking, the handling of the above-mentioned sensor overlapped areas G shown in FIG. 9 become a problem. In this embodiment, based on two types of 0/1 data, Y1 and Y2, obtained with respect to the same sensor overlapped area G, a value of Y for the linked 0/1 existence data is determined with respect to the sensor overlapped area G. Any of the following logical expressions may be used.

$Y = Y_1$ AND $Y_2$
$Y = Y_1$ OR $Y_2$
$Y = Y_1$
$Y = Y_2$

Furthermore, it is desirable to design the operating procedure of linkage generator 24 so that these expressions may be selected and used according to the state, for example, of the measurement area in the direction of detection line 10 of each head 14. Also, it is desirable to confirm and correct the optical axes by performing measurements with an infrared scope during the installation phase since, although the optical axes relating to the sensor overlapped area G can be determined from geometric calculations, in practice each head 14 has an installation error. Additionally, it is desirable to generate the linked 0/1 existence data with an additional coverage extending slightly beyond the left and right edges of the road. Therefore, the number of bits (data items) in the linked 0/1 existence data obtained in one scan is given in the following expression.

Road width/division width+additional coverage of roadside
where division width: measurement area (=E) in the direction of detection 10 of each optical axis) 0≦additional coverage of roadside≦number of optical axes per head/2 d) Application of Distance Measurement

In the operations or processes from the above-mentioned distance measurement to the linkage generation, the distance measurement result is used mainly to recognize the existence, for example, of vehicles 18. However, as shown in FIG. 10, the use of installation height A of head 14 enables the distance data to be converted to height data. For example, when a coordinate origin is set to the edge of the road, x coordinates are set in the direction of detection line 10, and z coordinates are set in an upward direction perpendicular to the road surface, the position (x,z) of an object on detection line 10 can be determined from the following expressions.

$$x = X - L \cdot \sin(\alpha \cdot (p-1)/2 - \alpha \cdot m)$$

$$z = Z - L \cdot \cos(\alpha \cdot (p-1)/2 - \alpha \cdot m)$$

where (x,z): position of head 14

L: Measurement result of distance from head 14 to object p: Number of optical axes of head 14 (natural number greater than or equal to 2)

m: Number of the optical axis capturing the object (m<p)

α: Angular interval between mutually adjacent optical axes

The z obtained from the expression is the height of the object. Since the value of $\cos(\alpha \cdot (p-1)/2 - \alpha \cdot m)$ is nearly 1 when α is sufficiently small,

Z=A can be used if height detection precision is not much of an issue. Thus, a simplified expression z=A−L can be used in the conversion of distance data to height data. The height data obtained in this manner can be used, for example, in identifying the type of vehicle. (Refer to Japanese Patent Application No. Hei 8-2237 by the same assignee as this patent application.)

e) Overview of Vehicle Detection Preprocessing

As described above, the linked 0/1 existence data generated by linkage generator 24 indicates the existence and positions of vehicles 18, for example, at various positions on detection line 10. As a rule, when the linked 0/1 existence data obtained from a certain scan includes a string of mutually adjacent value 1 bits (pixels) on detection line 10, vehicle detection preprocessor 28 regards this value 1 pixel string as representing a position and area on the road occupied by one vehicle 18. Conversely, as a rule, when the linked 0/1 existence data obtained from a certain scan includes a string of mutually adjacent value 0 pixels on detection line 10, vehicle detection preprocessor 28 regards this value 0 pixel string as representing a position and area on the road not occupied by any vehicle 18.

However, the linked 0/1 existence data generated by linkage generator 24 generally includes a pixel string that in fact should not be regarded as vehicle 18, even though it is shown as a value 1 pixel string, or a pixel string that in fact should be regarded as vehicle 18 or a part thereof even though it is shown as a value 0 pixel string. For example, if a piece of litter flies onto the road, that piece of litter may cause a value 1 pixel string to be generated, or for vehicles 18 having complex profiles, such as motorcycles or trailers, one vehicle 18 may cause multiple, independent value 1 pixel strings to be generated due to the influence of gaps, front ends, or angles, or when multiple vehicles 18 travel side by side in close proximity, these vehicles may cause a consecutive series of value 1 pixel strings (namely, not containing any value 0 pixel strings) to be generated. Vehicle detection preprocessor 26 removes from the linked 0/1 existence data the influence of various types of noise (flying litter and so forth), the influence of the complexity of profiles of vehicles 18 (complexity of profiles in a horizontal plane, presence of optical materials such as windows), and the influence of the traveling state of vehicles 18 (side by side travel and so forth), and is a means for performing vehicle detection processing more accurately in vehicle detection processor 28 by performing the six types of vehicle detection preprocessing shown in the following table in the sequence shown in the table, namely, from top to bottom, on the linked 0/1 existence data generated from linkage generator 22.

TABLE 1

List of processes in vehicle detection preprocessing

Figure 12:
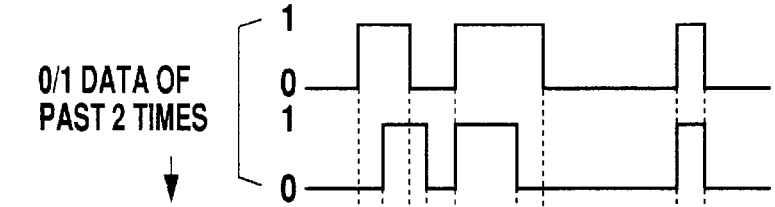
FIG. 12 is a timing chart conceptually showing operations of a Y character profile prevention process in vehicle detection preprocessing.
Figure 13:
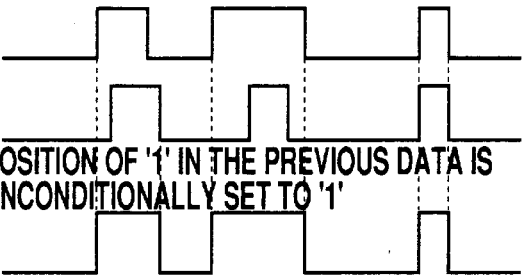
FIG. 13 is a timing chart conceptually showing operations of a delaying process and a maximum width checking process in vehicle detection preprocessing.

1. Filling-up
2. Noise rejection
3. Width maintaining
4. Y character profile prevention
5. Delaying
6. Maximum width checking Overviews of the processes shown in the table above are shown in FIG. 11~FIG. 13, respectively. The term "width" used in these figures denotes the length of a string of pixels having identical values that are mutually adjacent. The reason the term "width" is used is the "width" of a value 1 pixel string corresponds to the width of an object on detection line 10 and the "width" of a value 0 pixel string corresponds to the width of a gap between objects on detection line 10.

Characteristics common to these processes include a process for filtering the linked 0/1 existence data obtained from a recent scan, the use of properties or information regarding the general profiles of vehicles 18 during filtering, and the use of the linked 0/1 existence data obtained in the most recent previous scan or an earlier scan according to necessity.

For example, the filling-up process, which is executed first, is a filtering process that is concerned with the essential profiles of vehicles 18, particularly the gaps in vehicles 18. More specifically, as shown in FIG. 11, the process corrects any value 0 pixels (string) included in a recent linked 0/1 existence data having a width less than or equal to a predetermined number of pixels to a value 1 pixel string. When this process is performed on the linked 0/1 existence data, a value 0 pixel (string) having a comparatively small width included in a value 1 pixel string having a comparatively large width is corrected to a value 1 pixel string. This process is advantageous in cases where one vehicle 18 generates value 1 pixel strings at multiple locations, such as when vehicle 18, a motorcycle, for example, having a gap when viewed from above (namely, when viewed from head 14), exists on detection line 10. In the relevant cases, the filling-up process can correct value 1 pixel strings at multiple locations, which should be detected as one vehicle 18, to one consecutive series of value 1 pixels, namely, one value 1 pixel string, thus enabling subsequent vehicle detection processes to be executed more accurately.

The noise rejection process, which is executed second, is a filtering process that is concerned with the essential profiles of vehicles 18, particularly the profiles where there is a lower limit in a dimension in the direction of detection line 10. More specifically, as shown in FIG. 11, the process corrects any value 1 pixel string included in a recent linked 0/1 existence data and having a width less than or equal to a predetermined number of pixels to a value 0 pixel string. When this process is performed on the linked 0/1 existence data, a value 1 pixel string having a comparatively small width included in a value 0 pixel string having a comparatively large width is corrected to a value 0 pixel string. This process is advantageous in cases of flying litter, for example. In the relevant cases, the noise rejection process can correct value 1 pixel strings where independent vehicles 18 should not be detected to value 0 pixel strings, thus enabling subsequent vehicle detection processes to be executed more accurately.

The width maintaining process, which is executed third, is a filtering process that is concerned with the essential profiles of vehicles 18, particularly the profiles where the widths of vehicles 18 are nearly constant in the direction along the length of the road. More specifically, as shown in FIG. 11, when positions (former) where value 1 pixel strings appeared in the previous scan and positions (latter) where value 1 pixel strings appeared in the current scan at least partially overlap, this process corrects pixels, among those that changed to 0 in the current scan, that were included in the former and not in the latter, to value 1 pixel strings. When this process is performed on the linked 0/1 existence data, continuity regarding the widths of vehicles 18 is maintained with the linked 0/1 existence data obtained in the previous (more generally an earlier) scan. This process is advantageous in cases when vehicles 18, such as motorcycles, have a gap and the gap is large, or when at the rear portions of vehicles 18 the frameworks are exposed (such as trailers). In the relevant cases, the width maintaining process can fill up gaps too large for the filling-up process and can prevent various frames from being detected as separate vehicles 18 when they should be detected as one vehicle 18, thus enabling subsequent vehicle detection processes to be executed more accurately. Furthermore, since correlation between scans can be enhanced, subsequent processes are less susceptible to instability.

The Y character profile prevention process, which is executed fourth, is a filtering process that is concerned with the essential profiles of vehicles 18, particularly the complexity of their front end profiles. More specifically, as shown in FIG. 12, based on filter information determined according to the linked 0/1 existence data of multiple past scans, this process selectively corrects the value 1 pixel strings obtained in the current scan to value 0 pixel strings. If the scans used to determine the filter information comprise the past two scans (namely, if the Y character profile prevention parameter described later is 2), the Y character profile prevention process comprise the following steps:

i Adding linked 0/1 existence data of the past 2 scans at corresponding pixels configures a Y character profile prevention filter that allows each position to take one of the three values of 0, 1, or 2.

ii After the completion of i, decrementing by 1 the data at positions included in the Y character profile prevention filter and corresponding to value 0 pixels in the linked 0/1 existence data of the current scan, and incrementing by 1 the data at positions included in the Y character profile prevention filter corresponding to value 1 pixels (where the upper limit of data at each position on the Y character profile prevention filter is 2).

iii After the completion of ii, detecting value 1 pixel strings having a width of 2 or more included in the linked 0/1 data of the current scan, extracting value 1 pixel strings including positions at which the Y character profile prevention filter was a value of 2, and correcting the data value at positions included in the Y character profile prevention filter corresponding to all positions of the pixels comprising those value 1 pixel strings to 2.

iv After the completion of iii, correcting to a value of 1 the pixels in the linked 0/1 existence data of the current scan where the corresponding positions on the Y character profile prevention filter have data value of 2.

In FIG. 12, steps i and ii are called the "first stage" and steps iii and iv are called the "second stage." When these steps are performed on the linked 0/1 existence data, the width changes appearing in the past two or more scans (generally multiple scans) in the linked 0/1 existence data output from linkage generator 24 are smoothed. This process for filtering based on the linked 0/1 existence data of multiple past scans is advantageous in cases where it is difficult to detect vehicle 18 as a single vehicle 18 since it has a complex front end profile with multiple branches. In the relevant cases, the Y character profile prevention process can group multiple value 1 pixel strings into one value 1 pixel string so as to not lose the correlation between scans, thus enabling subsequent vehicle detection processes to be more accurately executed.

The delaying process, which is executed fifth, is a filtering process that is concerned with the essential profiles of vehicles 18, particularly the profiles where the widths of vehicles 18 are nearly constant in the direction along the length of the road. More specifically, as shown in FIG. 13, this process corrects to a value of 1 all pixels in a consecutive series of value 1 pixels in the previous scan that changed to a value of 0 in the current scan. When this process is performed on the linked 0/1 existence-data, the continuity regarding the widths of vehicles 18 is maintained with the linked 0/1 existence data obtained in the previous (more generally an earlier) scan. This process is advantageous not only in cases where the width maintaining process is effective, but also in cases where unstable measurements due to some cause cannot be ignored. In the relevant cases, the delaying process, similar to the width maintaining process, enables subsequent vehicle detection processes to be executed more accurately. Furthermore, since correlation between scans can be enhanced, the subsequent processes are less susceptible to instability.

The maximum width checking process, which is executed last, is a process for coping with the traveling state, such as side by side travel in close proximity, of vehicles 18 and is a filtering process that is concerned with the essential profiles where there is generally an upper limit in vehicle widths. More specifically, as shown in FIG. 13, when the width of a value 1 pixel string is greater than or equal to a predetermined value, this process corrects pixels selected at intervals of a predetermined maximum vehicle width in the value 1 pixel string to values of 0. When this process is performed on the linked 0/1 existence data, a long value 1 pixel string is divided into multiple value 1 pixel strings having widths less than or equal to the maximum vehicle width. In cases where this process is advantageous, namely, in cases where multiple vehicles 18 travel side by side in close proximity, the maximum width checking process enables multiple vehicles 18 to be separated and detected, and to be less susceptible to false detection as one vehicle 18.

As clearly outlined above, when the execution sequence of the various vehicle detection preprocesses mentioned above is changed, such as when the filling-up process and the noise rejection process are exchanged, the final result of the processes or the contents of the linked 0/1 existence data will be different. Therefore, as shown in Table 1, the execution sequence of the various processes has been set in this embodiment so that the effects are not mutually canceled but are mutually enhanced. For example, executing the processes that are advantageous with respect to the causes of false detection (arising from flying litter or other situations, for example) related only to a comparatively small number of pixels, such as the filling-up and noise rejection processes, prior to the processes that are advantageous with respect to the causes of false detection (arising from the complexity of moving object profiles or traveling state of moving objects, for example), related to a comparatively large number of pixels, such as the width maintaining, Y character profile prevention, delaying, and maximum width checking processes, enhances the effect of preventing false detection in the width maintaining, Y character profile prevention, delaying, and maximum width checking processes in this embodiment. Also, executing the Y character profile prevention process after the width maintaining process further enhances the effect of the Y character profile prevention process in this embodiment by maintaining the width of vehicle 18 relating to comparatively detailed profile characteristics of vehicle 18 and then maintaining the width of vehicle 18 relating to larger profile characteristics of vehicle 18. Furthermore, executing the maximum width checking process after the filling-up, noise rejection, width maintaining, Y character profile prevention, and delaying processes enables multiple vehicles 18 to be accurately separated and detected in this embodiment since the width of the value 1 pixel string is expanded as much as possible, then divided into value 1 pixel strings relating to multiple vehicles 18.

f) Details of Vehicle Detection Preprocessing

Various processes that are executed by vehicle detection preprocessor 26 are described next according to their desirable execution sequence. A list of variables used in the following description is given in Table 2.

TABLE 2

Arguments of arrays are positions or their corresponding pixel numbers along detection line 10

| | |
|---|---|
| ary[●] | : Array of linked 0/1 existence data in current scan (called "current data" hereinafter) |
| bgn | : Beginning number of valid data in ary[●] (valid data: already used bit in ary[●]) |
| end | : Ending number of valid data in ary[●] |
| supply | : Maximum width of value 0 pixel string to be filled up as a hole |
| tail | : Number of pixel of final point of filling-up process |
| mask | : Maximum width of value 1 pixel string to be rejected as noise |
| preRslt[●] | : Array (for which width maintaining process has been completed) of linked 0/1 existence data in previous scan (called "previous data" hereinafter) |
| flg | : Maintaining execution flag |
| yg_filter[●] | : Array of filter information to be used in Y character profile prevention process, namely, Y character profile prevention filter |
| YG_FLAG | : Y character profile prevention parameter |
| start | : Variable storing the start point of value 1 pixel string |
| mark | : Y character profile prevention execution flag |
| length | : Y character profile prevention execution length |
| delay_data[●] | : Array of delay data to be used in the delaying process |
| width | : Maximum vehicle width parameter |
| cnt | : Maximum vehicle width count value |
| i,j,k | : Loop variables | f1) Filling-up Process

Figure 14:
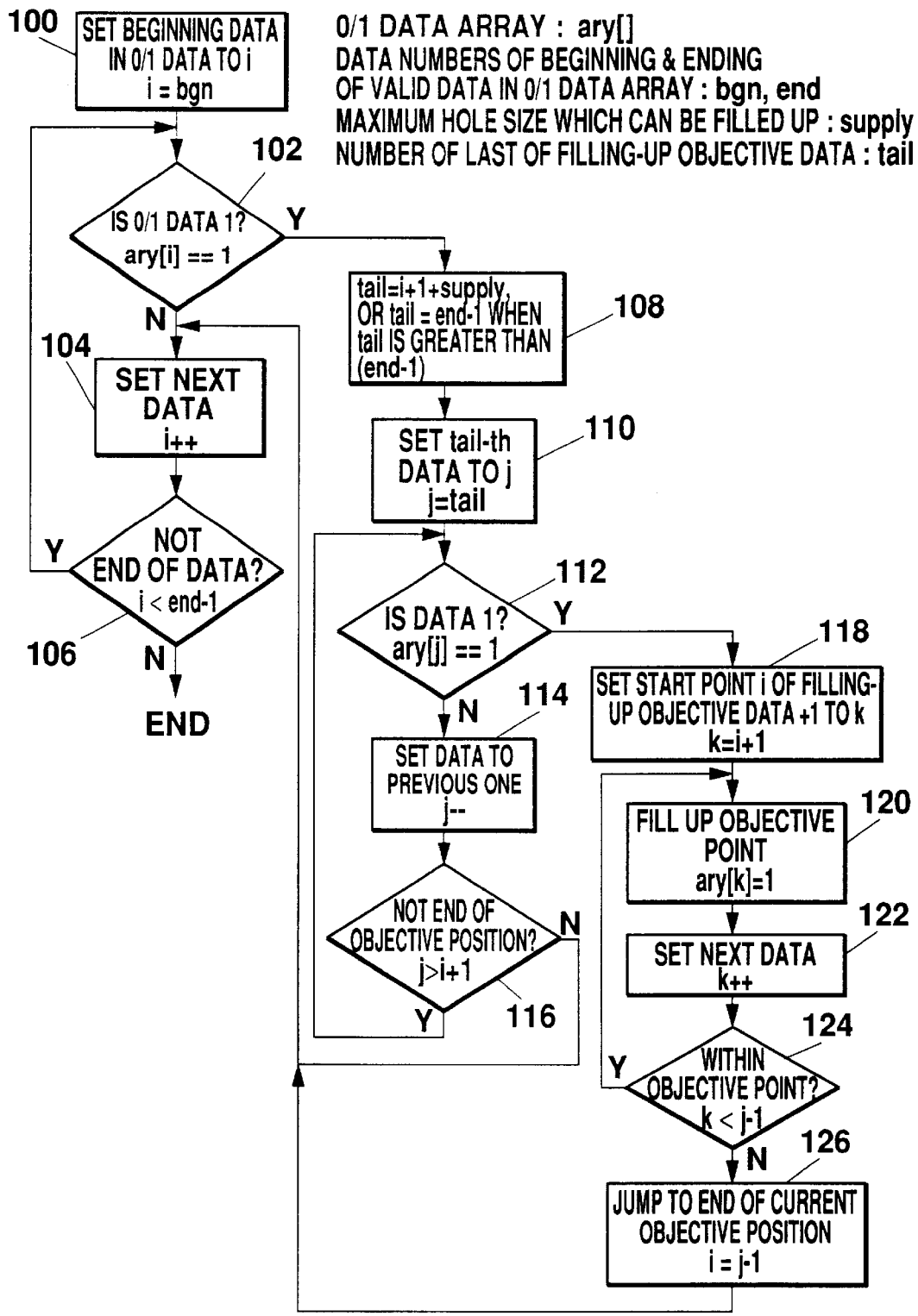
FIG. 14 is a flowchart showing a procedure for the filling-up process.

The filling-up process shown in FIG. 14 (called simply "filling-up") is a process for correcting a "hole", which is defined as a value 0 pixel string in valid data in ary[·] that is sandwiched by value 1 pixel strings and has a width less than or equal to "supply", to a value 1 pixel string. To achieve the relevant process, vehicle detection preprocessor 26 detects (102) an i-th pixel having the value 1 according to an ascending sequence of pixel numbers (104) in the contents from ary[bgn] to ary[end] (100, 106).

Since the detected pixel is regarded as a pixel included in the value 1 pixel string (or an isolated value 1 pixel), vehicle detection preprocessor 26 uses this pixel as the start point and sets "tail" according to the following expression (108).

$$\text{tail} = i + 1 + \text{supply} \quad (\text{when } i + 1 + \text{supply} \leq \text{end} - 1)$$
$$= \text{end} - 1 \quad (\text{when } i + 1 + \text{supply} > \text{end} - 1)$$

Vehicle detection preprocessor 26 executes a detection of a pixel number "j" (112) having a value of 1 according to a descending sequence (114) of pixel numbers from a tail-th pixel to an i+1-th pixel (110, 116).

When number j of a pixel having a value of 1 is detected, vehicle detection preprocessor 26 corrects (120) the value of pixels according to an ascending sequence of pixel numbers (122) from an i+1-th pixel to a j−1-th pixel (118, 124), to values of 1. Therefore, even if a hole exists between the i+1-th pixel to the j−1-th pixel, the hole is filled by step 120. When a value 1 pixel could not be detected even from a repetition of step 112, or after a hole in a string from the i+1-th pixel to the j−1-th pixel is filled up, vehicle detection preprocessor 26 returns execution to step 104. At this time, searching for value 1 pixel starts from the end of value 1 pixel string which has been subjected to steps 118 to 124 (126).

f2) Noise Rejection Process

Figure 15:
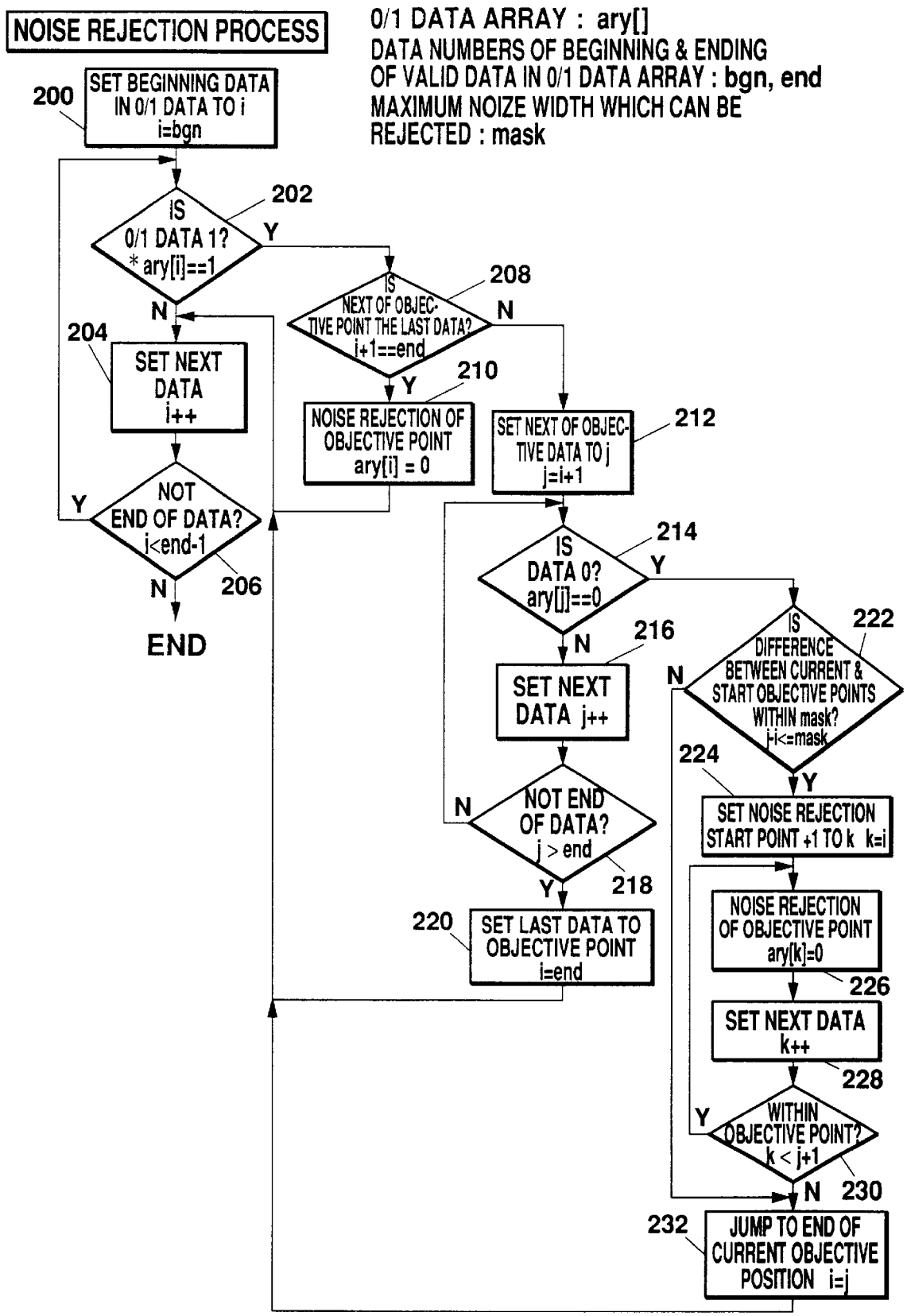
FIG. 15 is a flowchart showing a procedure for the noise rejection process.

The noise rejection process shown in FIG. 15 is a process for correcting value 1 pixels (strings) among valid pixels in ary[·] that are sandwiched by value 0 pixels (strings) and have widths less than or equal to "mask", to value 0 pixels (strings). To achieve the relevant process, vehicle detection preprocessor 26 executes a detection of number i of value 1 pixels (202) according to an ascending sequence of pixel numbers (204) from ary[bgn] to ary[·end] (200, 206). When number i of a pixel having a value of 1 is detected, vehicle detection preprocessor 26 unconditionally corrects that pixel to a value 0 pixel (210) if that pixel is the end−1-th pixel (208). Otherwise, vehicle detection preprocessor 26 executes a detection of numbering j of value 0 pixels (214) according to an ascending sequence of pixel numbers (216) from ary[i+1] to ary[end−1] (212, 218). When number j of a value 0 pixel is detected, vehicle detection preprocessor 26 judges whether the width of a value 1 pixel string included in a pixel string from ary[i] to ary[j] is less than or equal to "mask" (222), and regards the value 1 pixel string as noise if the strings width is less than or equal to "mask". In this case, vehicle detection preprocessor 26 corrects the value of pixels in the value 1 pixel string to values of 0 (226) according to an ascending sequence of pixel numbers (228) from ary[i] to ary[j] (224, 230). After the execution of step 210, or when a value 0 pixel could not be detected even from a repetition of step 214, or after noise rejection is completed from ary[i] to ary[j], vehicle detection preprocessor 26 transfers execution to step 204. A pixel tested for value by a repetition of step 214, or a pixel that was corrected by a repetition of step 226 is excluded (220, 232) from being subjected to the processes starting from the transfer destination of step 204.

f3) Width Maintaining Process

Figure 16:
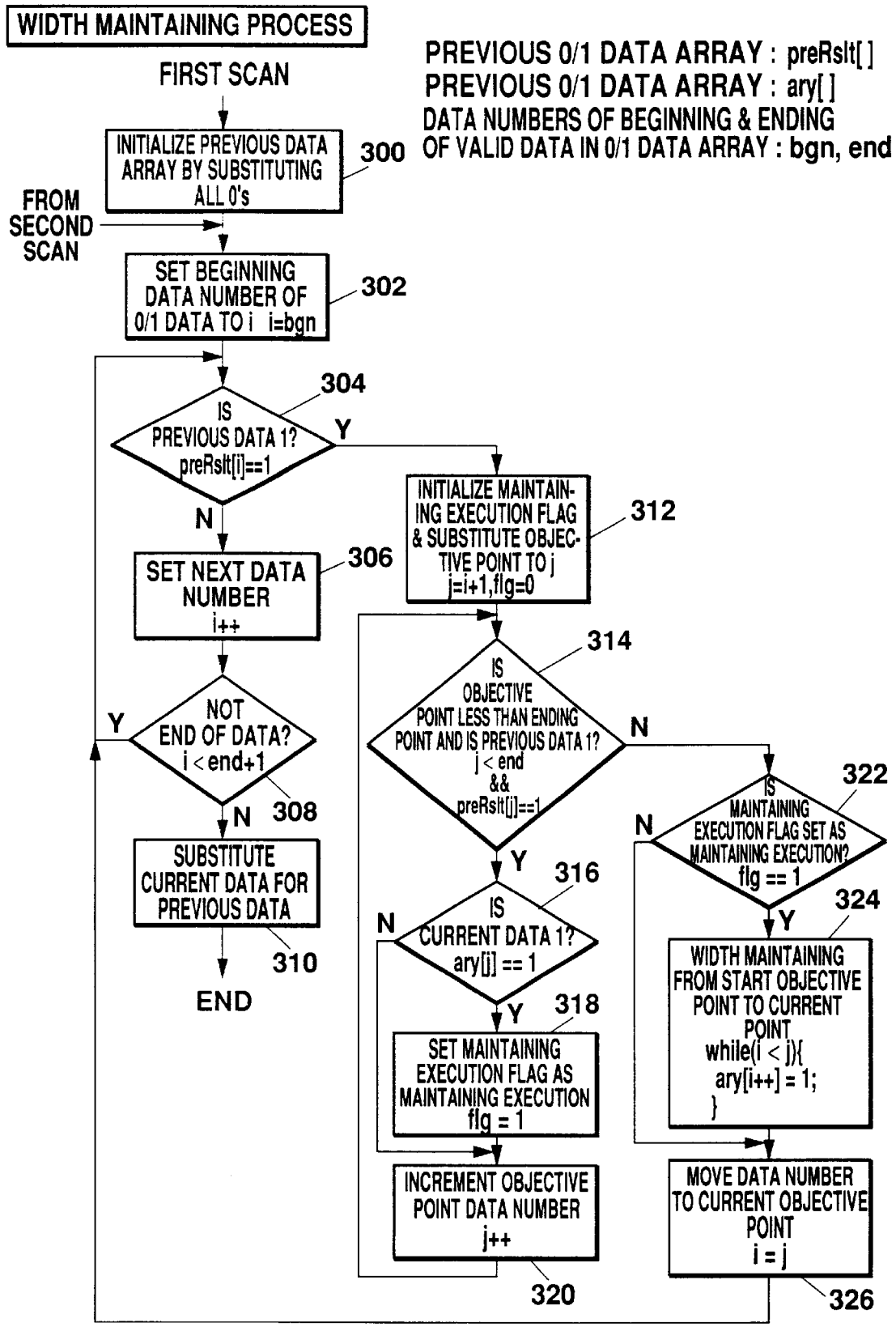
FIG. 16 is a flowchart showing a procedure for the width maintaining process.

The width maintaining process shown in FIG. 16 is a process for maintaining the width of value 1 pixel strings appearing in preRslt[·] even for corresponding value 1 pixel strings in ary[·]. To achieve the relevant process, vehicle detection preprocessor 26 executes a detection of number i of value 1 pixels (304) according to an ascending sequence of pixel numbers (306) from preRslt[bgn] to preRslt[end] (302, 308). Since number i of a value 1 pixel that is detected is considered to have the number of the start pixel of the value 1 pixel string (or a number of the isolated value 1 pixel) included in preRslt[·], vehicle detection preprocessor 26 sets flg=0 (312) and executes a detection of number j of value 1 pixels (314) according to an ascending sequence of pixel numbers (320) from preRslt[i+1] within a limit of preRslt[end] (312, 314). If number j of a value 1 pixel could be detected and ary[j]=1 (316), vehicle detection preprocessor 26 sets flg=1 (318).

When the processing in steps 314 to 320 is completed or when a valid last pixel was detected (314) with regard to the entire value 1 pixel string starting from an i-th pixel in preRslt[·], vehicle detection preprocessor 26 corrects (324) all value 0 pixels corresponding to this value 1 pixel string among pixels in ary[·] to values of 1. However, when fig=1 is not true (322), value 1 pixels (string) overlapping the value 1 pixel string starting from the i-th pixel in preRslt[·] is regarded as not being in ary[·] so that step 324 is skipped (322). Vehicle detection preprocessor 26, after skipping (326) the pixels for which steps 312 to 324 have been completed, subsequently transfers execution to step 304. When the processing in steps 304 to 308 completes until preRslt[end], vehicle detection preprocessor 26 substitutes (310) the values of all pixels in ary[·] for the corresponding pixels of preRslt[·] for use in executing the width maintaining process for subsequent scans.

If the current scan is the first scan, all pixels in preRslt[·] are set to values of 0 (300) prior to step 302, and subsequently the execution of steps 304 to 310 initializes preRslt[·].

f4) Y Character Profile Prevention Process

Figure 17:
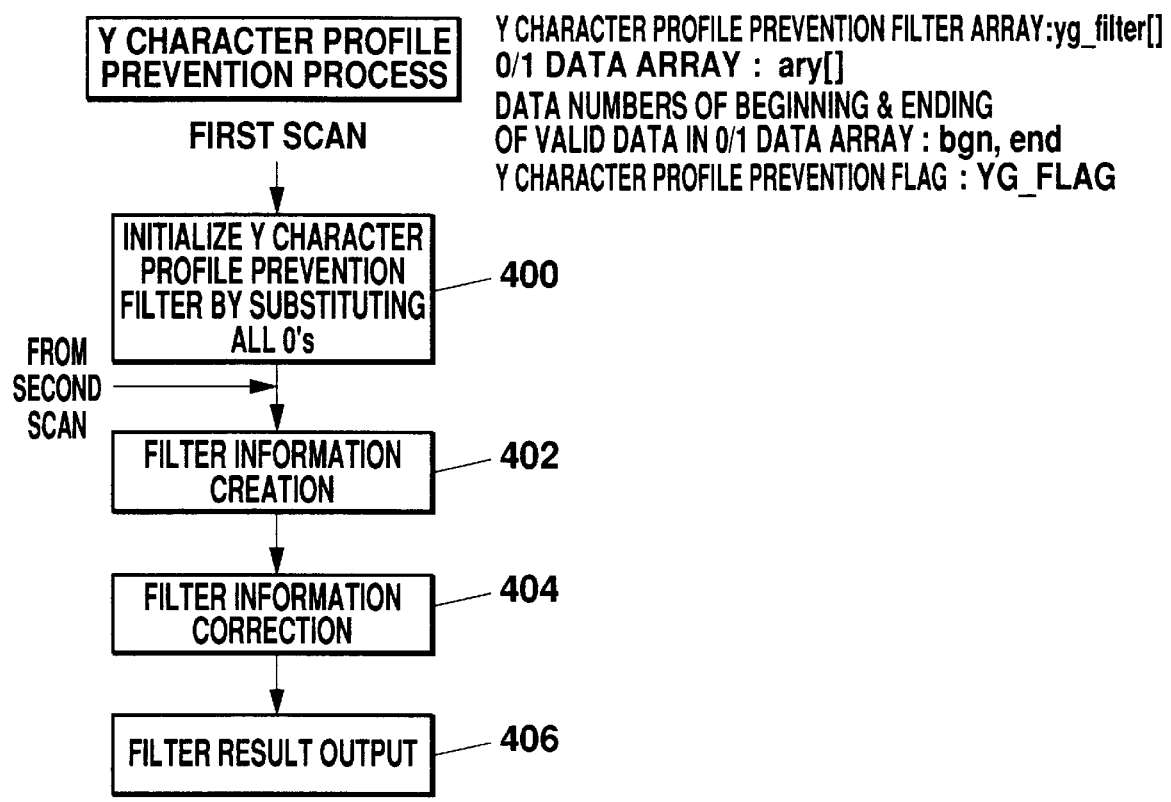
FIG. 17 is a flowchart showing a procedure for the Y character profile prevention process.

The Y character profile prevention process shown in FIG. 17 executes a procedure that creates yg_filter[·] based on ary[·] in addition to the previous yg_filter[·] (402), corrects this based on ary[·] (404), and outputs ary[·] which was filtered with the corrected yg_filter[·] (406). In this procedure, at least the linked 0/1 existence data of the past YG_FLAG-th scan or later is reflected and stored in yg_filter[·] (thus generating filter information), and the upper limit value of yg_filter[·] is restricted by YG_FLAG. If the current scan is the first scan, vehicle detection preprocessor 26 substitutes values of 0 for all positions in yg_filter[·] (400), then executes from step 402.

Figure 18:
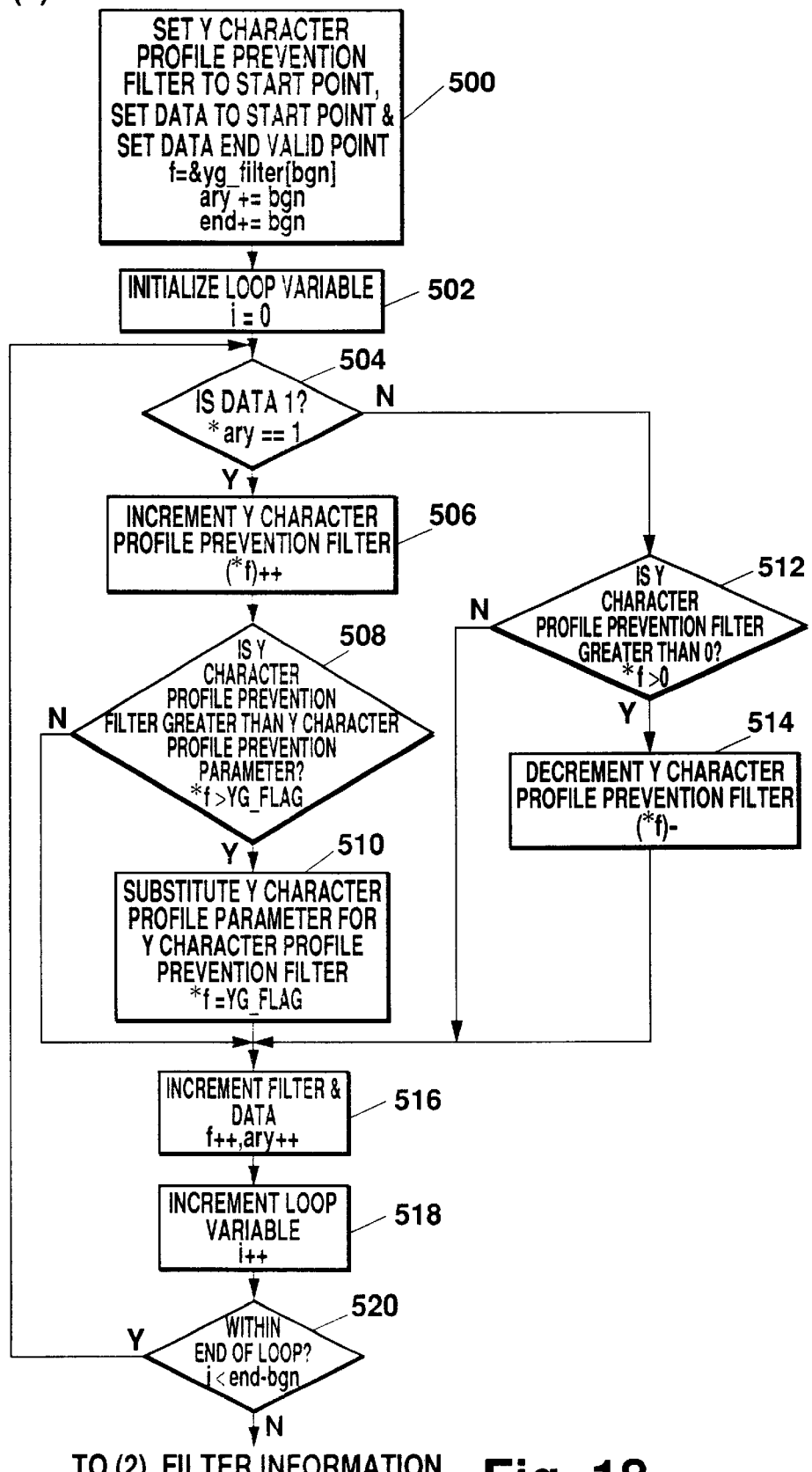
FIG. 18 is a flowchart showing a procedure for a filter information creation process in the Y character profile prevention process.

When creating yg_filter[·] (402), as shown in FIG. 18, vehicle detection preprocessor 26 detects pixels having values of 1 (504) according to an ascending sequence of pixel numbers (516, 518) in a pixel string from ary[bgn] to ary[end] (500, 502, 520), increments values in yg_filter[·] by 1 (504, 506) with regard to positions corresponding to pixels for which ary[·]=1 is true, and decrements values in yg_filter[·] by 1 (504, 514) with regard to pixels corresponding to positions for which ary[·]=1 is false. However, vehicle detection preprocessor 26 limits values in yg_filter[·] to a range of 1 to YG_FLAG (510, 514) so that results of the increment operations do not exceed YG_FLAG (508) and results of the decrement operations do not drop to 0 or below (512). Vehicle detection preprocessor 26 repeats the process from step 504 until the creation of yg_filter[·] is completed (520) with regard to positions from yg_filter[bgn] to yg_filter[end]. Refer to the first stage in FIG. 12 (note that FIG. 12 shows an example for YG_FLAG=2) given previously regarding a more specific image of this processing.

Figure 19:
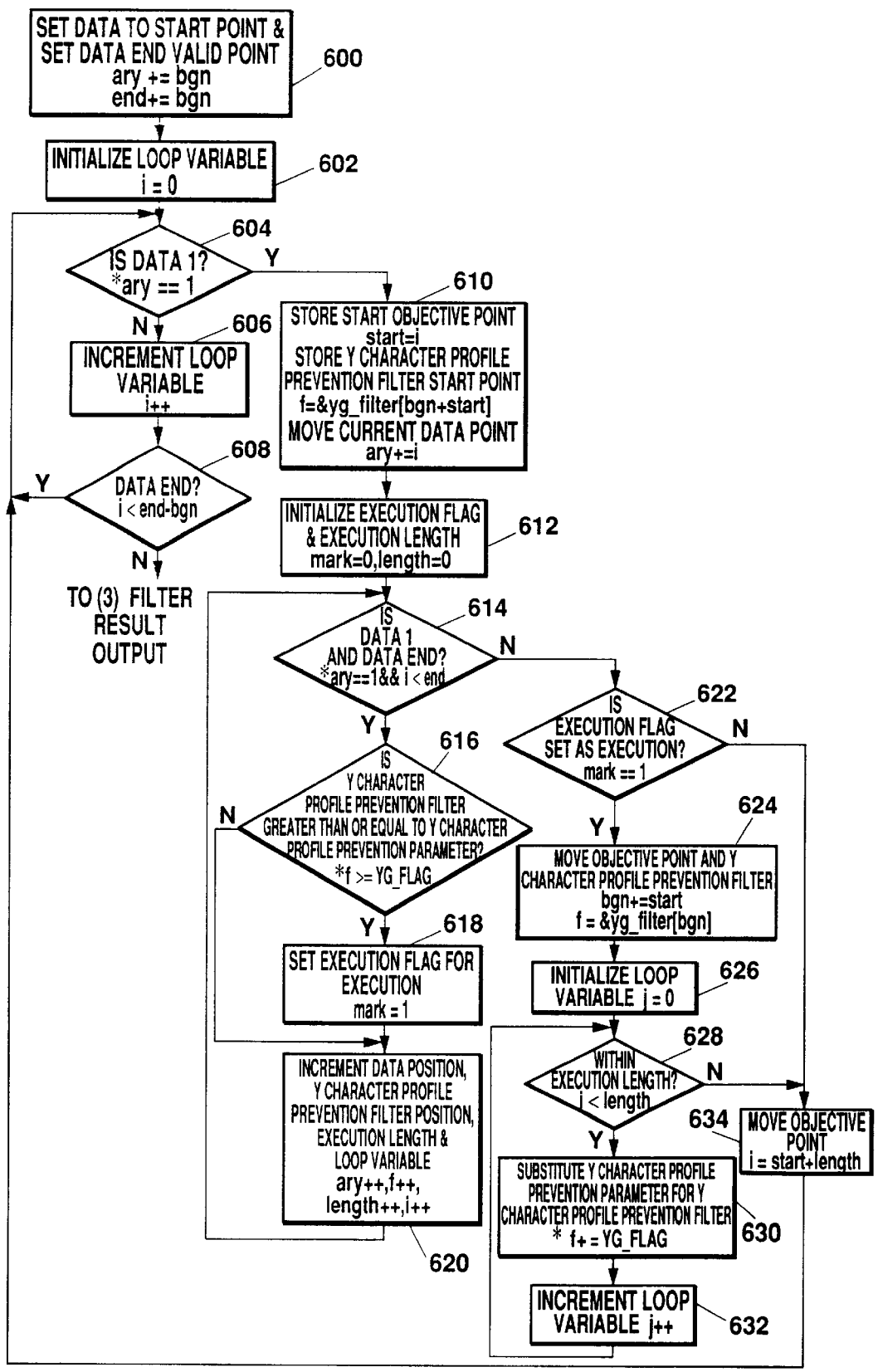
FIG. 19 is a flowchart showing a procedure for a filter information correction process in the Y character profile prevention process.

When correcting yg_filter[·] (404), as shown in FIG. 19, vehicle detection preprocessor 26 detects number i of value 1 pixels (604) according to an ascending sequence of pixel numbers (606) in a pixel string from ary[bgn] to ary[end] (600, 602, 608). If number i of a value 1 pixel could be detected as counted from a bgn-th pixel, vehicle detection preprocessor 26 executes various processes, such as storing number i in variable "start" and resetting "mark" and "length" to 0 (610, 612), then detects value 1 pixels (614) in a pixel string from ary[start] to ary[end] (614) according to an ascending sequence of pixel numbers and while incrementing variables (620), such as "length". If a value 1 pixel could be detected, vehicle detection preprocessor 26 sets "mark" to 1 (618) when the value of yg_filter[·] at a position corresponding to the pixel is greater than or equal to YG_FLAG (616). If a value 1 pixel string starting from ary[start] ends and steps 614 to 620 are completed for all valid pixels (614), vehicle detection preprocessor corrects the values of positions from yg_filter[start] (624, 626) to yg_filter[start+length] (628, 632), to a value of YG_FLAG (630). After this correction is completed, or when a value in yg_filter[·] at a position corresponding to a value 1 pixel string that is output in steps 614 to 620 is not greater than or equal to YG_FLAG (622), vehicle detection preprocessor 26 increments by the amount "length" a pixel number to be processed (634), then transfers execution to step 604. Refer to the description regarding the second stage in FIG. 12 for a more specific image of the processing above.

Figure 20:
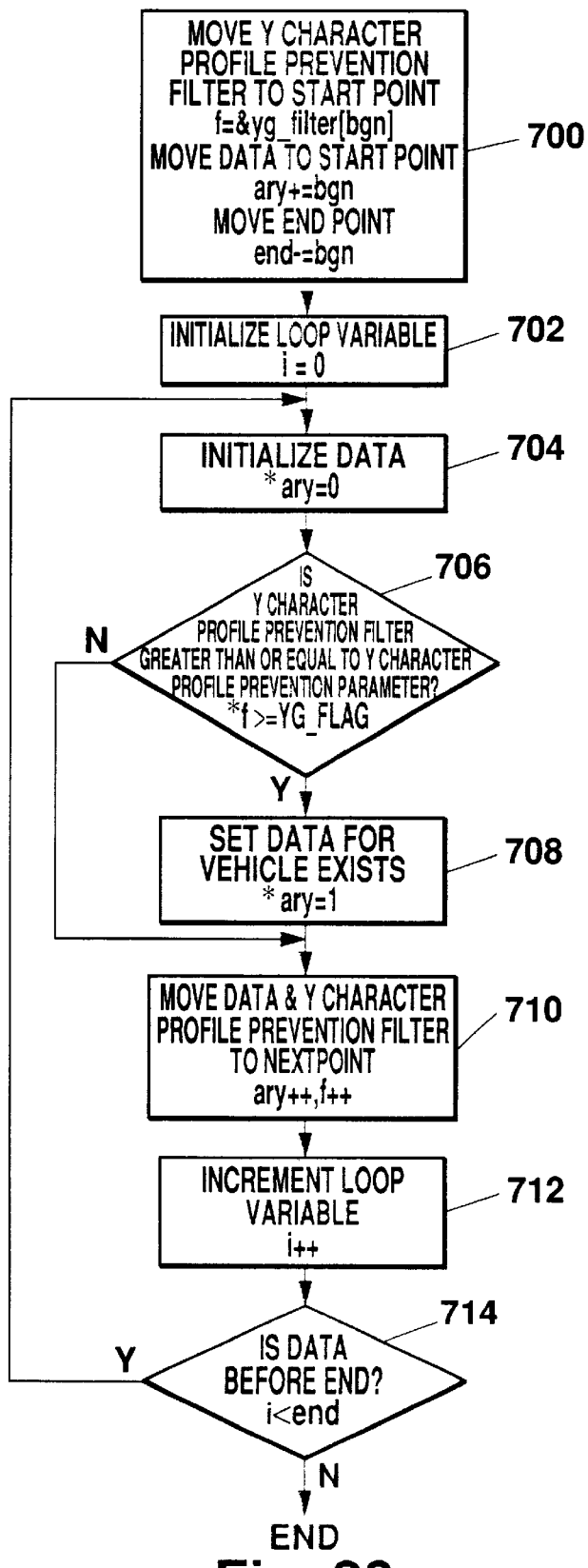
FIG. 20 is a flowchart showing a procedure for a filter result output process in the Y character-profile prevention process.

When outputting filtered ary[·] (406), as shown in FIG. 20, vehicle detection preprocessor 26 initializes (704) pixels included in a pixel string from ary[bgn] to ary[end] (700, 702, 714) according to an ascending sequence of pixel numbers (710, 712), then sets those pixels in ary[·] to values of 1 (708) when values in yg_filter[·] at positions corresponding to those pixels are greater than or equal to YG_FLAG (706).

f5) Delaying Process

Figure 21:
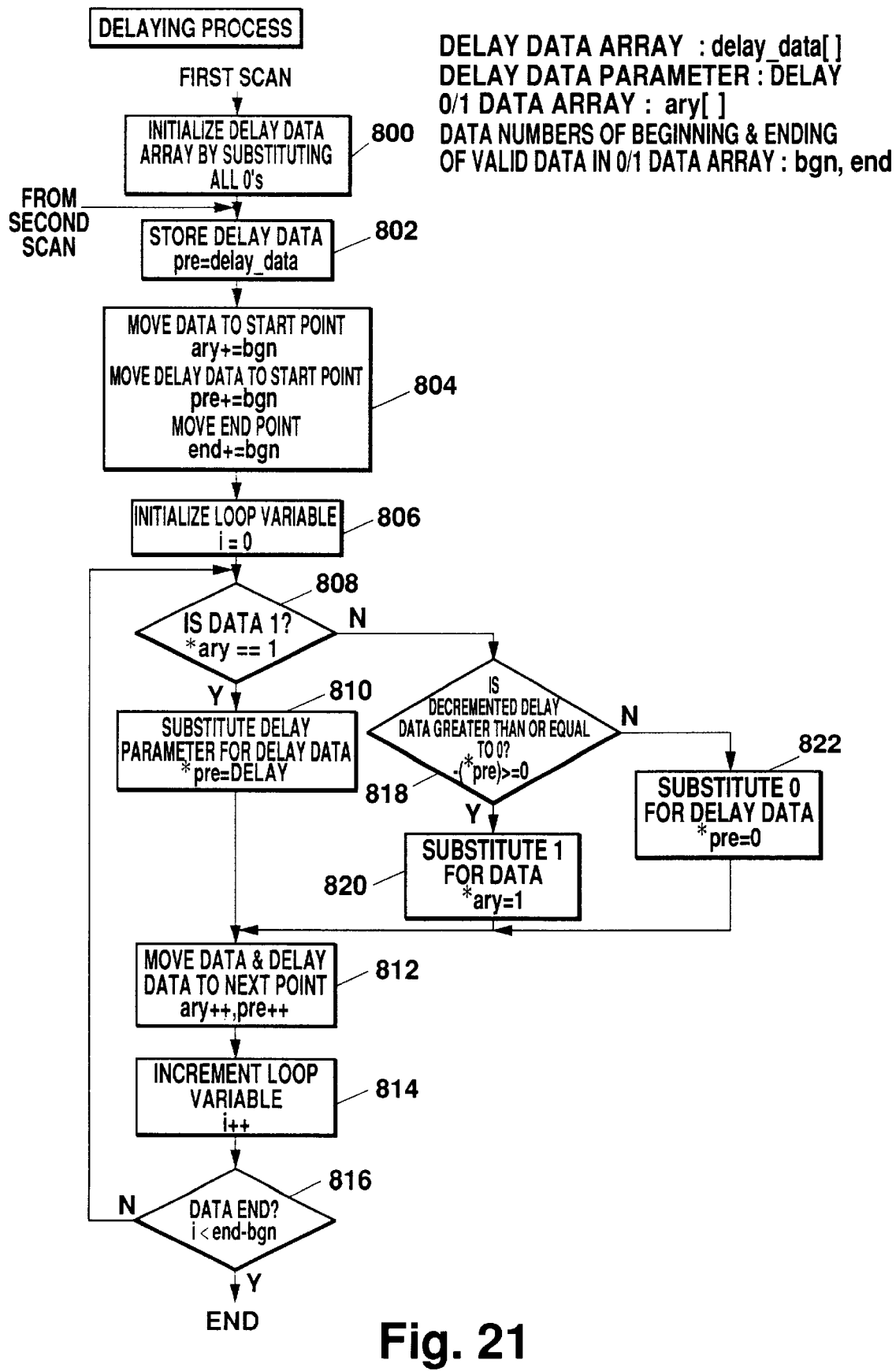
FIG. 21 is a flowchart showing a procedure for the delaying process.

The delaying process shown in FIG. 21 is a process for correcting pixels in ary[·] to values of 1, corresponding to pixels in delay_data[·] having values of 1. To achieve the relevant process, vehicle detection preprocessor 26 detects value 0 pixels (808) according to an ascending sequence of pixel numbers (812, 814) from pixels included in a pixel string from ary[bgn] to ary[end] (802, 804, 806, 816). When a value 0 pixel could be detected and if a pixel in delay_data[·] corresponding to the value 0 pixel has a value of 1 (818), vehicle detection preprocessor 26 corrects the value 0 pixel to a value of 1 (820), and if not, sets the corresponding pixel in delay_data[·] to a value of 0 (822). Also, with regard to the pixel in step 808 that was considered not to be equal to a value of 0, vehicle detection preprocessor 26 substitutes the value of the pixel, namely, a value of 1, for the corresponding pixel in delay_data[·] (810). If the current scan is the first scan, vehicle detection preprocessor 26 initializes all pixels in delay_data[·] to values of 0 (800) prior to step 802.

f6) Maximum Width Checking Process

Figure 22:
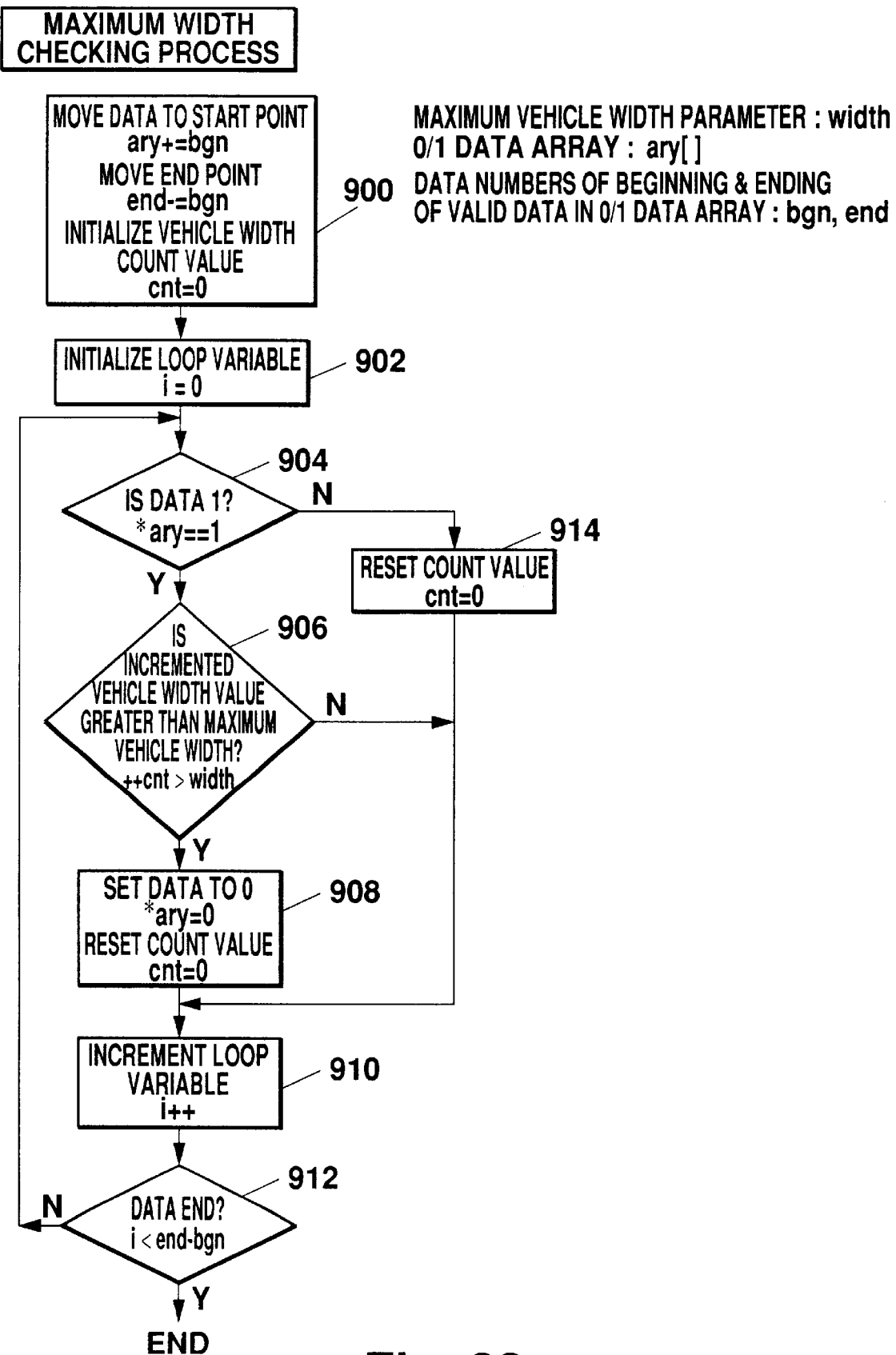
FIG. 22 is a flowchart showing a procedure for the maximum width checking process in vehicle detection preprocessing.

The maximum width checking process shown in FIG. 22 is a process for dividing a value 1 pixel string when a width of the value 1 pixel string in ary[·] exceeds "width". To achieve the relevant process, vehicle detection preprocessor 26 detects value 1 pixels (904) according to an ascending sequence of pixel numbers (910) from pixels included in a pixel string from ary[bgn] to ary[end] (900, 902, 912). Each time a value 1 pixel can be detected, vehicle detection preprocessor 26 increments cnt by 1 (906), which has been reset to 0 beforehand (900, 908, 914). If a value 1 pixel detected in step 904 is not an isolated value 1 pixel but part of a value 1 pixel string, steps 900 to 912 are repeated and cnt is gradually incremented. A comparison of cnt and "width" in step 906 detects any value 1 pixel string having a width greater than "width", and according to this detection, vehicle detection preprocessor 26 sets ary[·]=0 with regard to pixels until cnt>width and sets cnt=0 (908). cnt=0 is also set (914) if a value 1 pixel could not be detected in step 904.

g) Vehicle Detection Process

Figure 23:
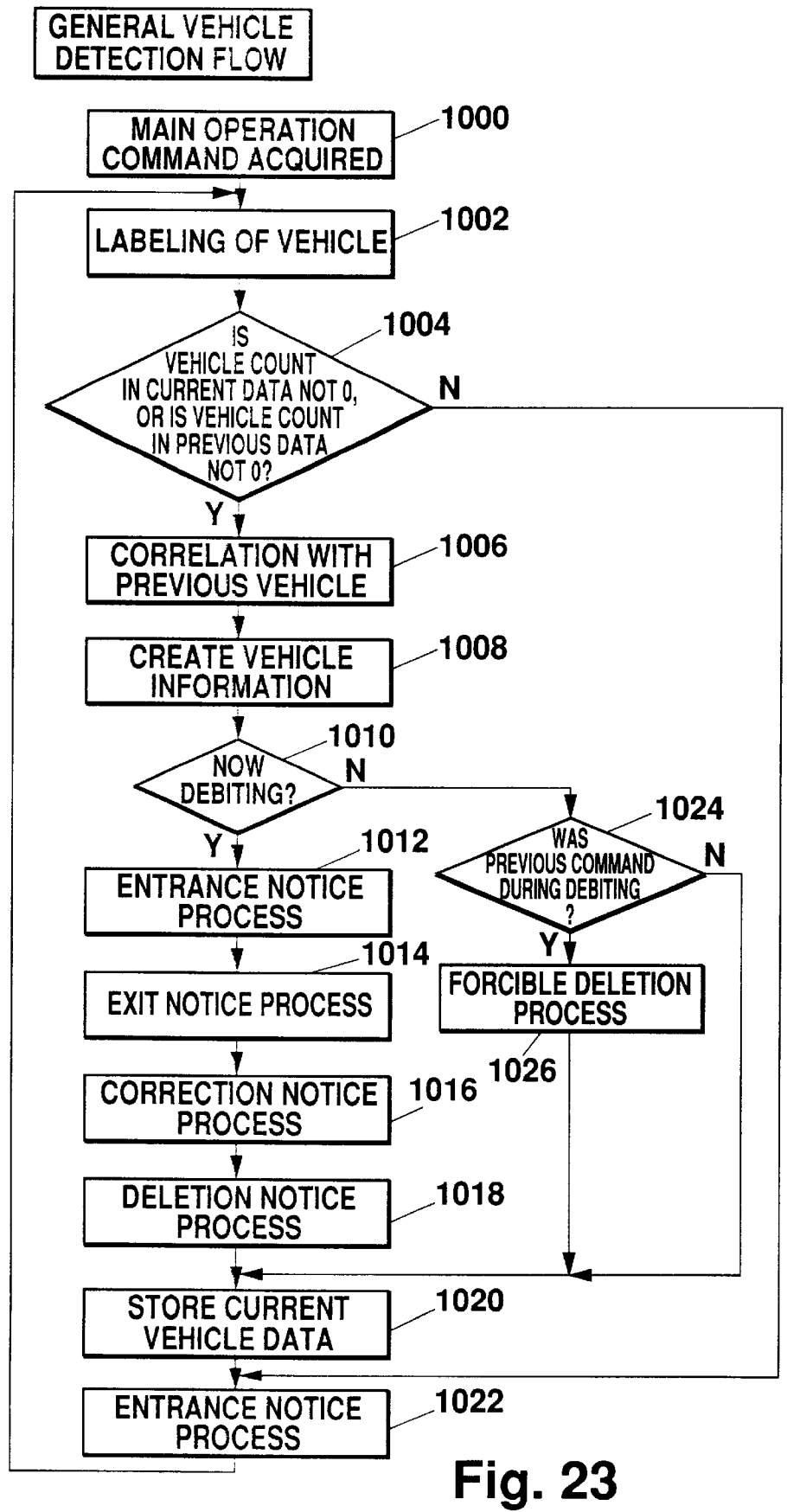
FIG. 23 is a flowchart showing a procedure for vehicle detection processing.

After acquiring an operation command (1000) from a host system (main computer), vehicle detection processor 28 executes a loop process from step 1002 in FIG. 23, namely, the vehicle detection process. By the vehicle detection process, vehicle detection processor 28 creates a detected vehicle data storing scheme shown in a listing in FIG. 24. The detected vehicle data storing scheme shown in this figure includes, in scheme typedef struct {...} }_VDET_DT:, which is created in every scan, the number of value 1 pixel strings in the current data, namely, a detected vehicle count vdet_now.v_num (refer to step 1128 in FIG. 26), and individual vehicle information _VDET created for each value 1 pixel string in the current data, namely, for each vehicle 18.

Figure 26:
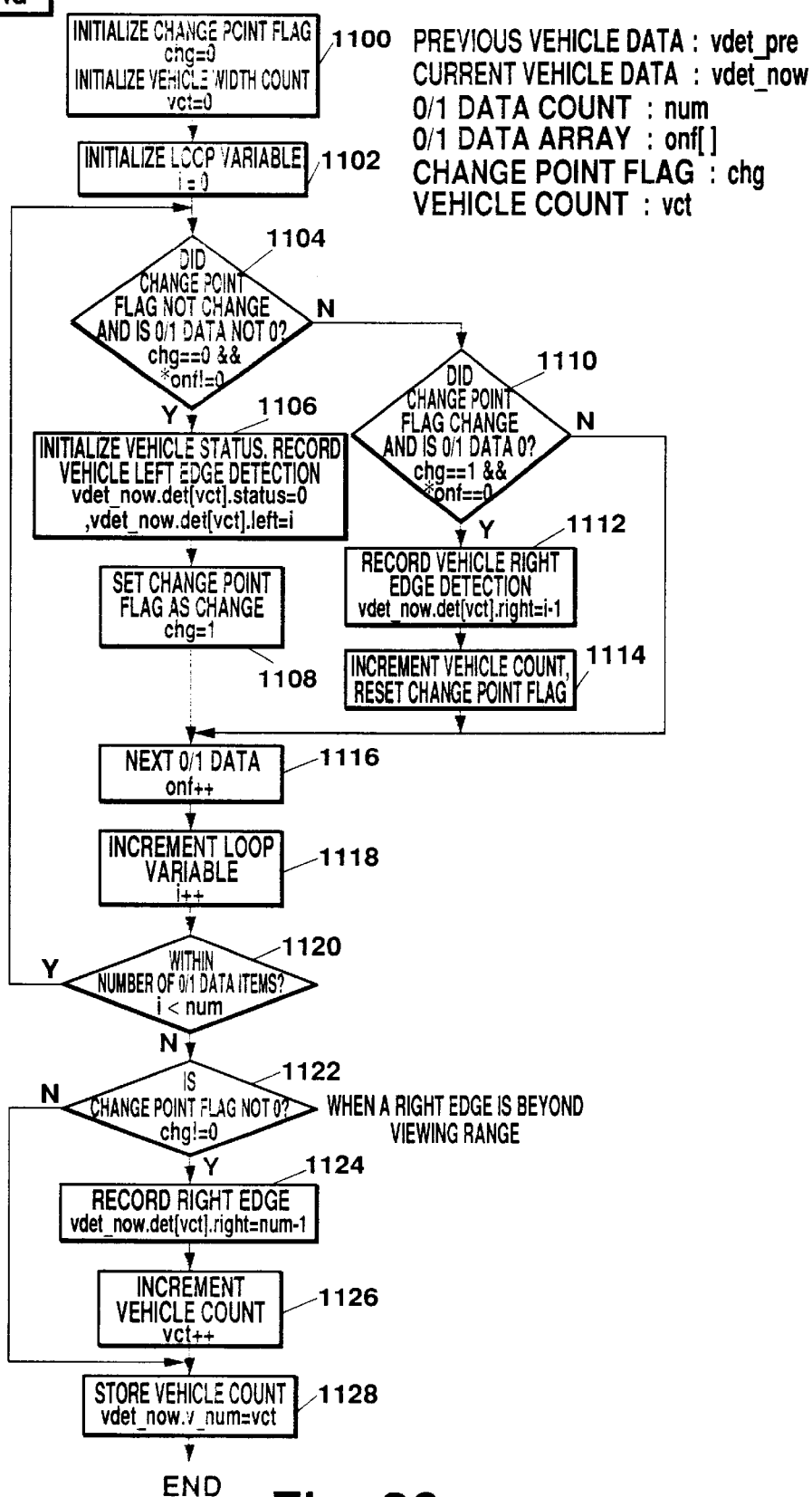
FIG. 26 is a flowchart showing a procedure for the vehicle labeling process in vehicle detection processing.

Individual vehicle information _VDET is defined by declaration typedef struct {...} _VDET:. In each individual vehicle information _VDET included in this declaration, vdet_now.det[i].main_cmd stores the above-mentioned operation command. vdet_now.det[i].status indicates the existence of an i-th value 1 pixel string in the current data (refer to step 1106 in FIG. 26). vdet_now.det[i].vehcle_no is the number of vehicle 18 corresponding to the i-th value 1 pixel string in the current data, namely, the number of the i-th vehicle 18 detected in the current scan. vdet_now.det [i].pct_req supplies a picturing command with respect to the i-th vehicle 18.

vdet_now.det[i].left and vdet_now.det[i].right supply positions of the left edge and right edge, respectively, of the i-th vehicle 18 (refer to steps 1106 and 1112 in FIG. 26). The width of the i-th vehicle 18 can be determined from their difference. vdet_now.det[i].min_width, vdet_now.det[i].max_width, and vdet_now.det[i].add_width supplies, respectively, with regard to the same vehicle 18 as the i-th vehicle 18 that was detected in the current scan, a minimum value, a maximum value, and a cumulative value of widths detected in the previous scans. vdet_now.det[i].line_num supplies a length (number of detection scans) of the i-th vehicle 18. Therefore, the mean width of the i-th vehicle 18 can be known from vdet_now.det[i].add_width and vdet_now.det[i].line_num.

In addition, the center of the i-th vehicle 18 can also be known from vdet_now.det[i].left and vdet_now.det[i].right. vdet_now.det[i].add_center is a value totaling the center positions, namely, a total center position, and a mean center position of the i-th vehicle 18 can be known from it and vdet_now.det[i].line_num. Furthermore, vdet_now.det[i].min-left and vdet_now.det[i].max-right are a minimum value of the left edge and a maximum value of the right edge, respectively, that were detected in the previous scans with regard to the same vehicle 18 as the i-th vehicle 18 detected in the current scan. Furthermore, vdet_now.det [i].passed-time holds the entrance time of the i-th vehicle. Notification of the entrance time along with an exit time described later during an exit notice process enables a passage time of the vehicle 18 to be known.

Figure 27:
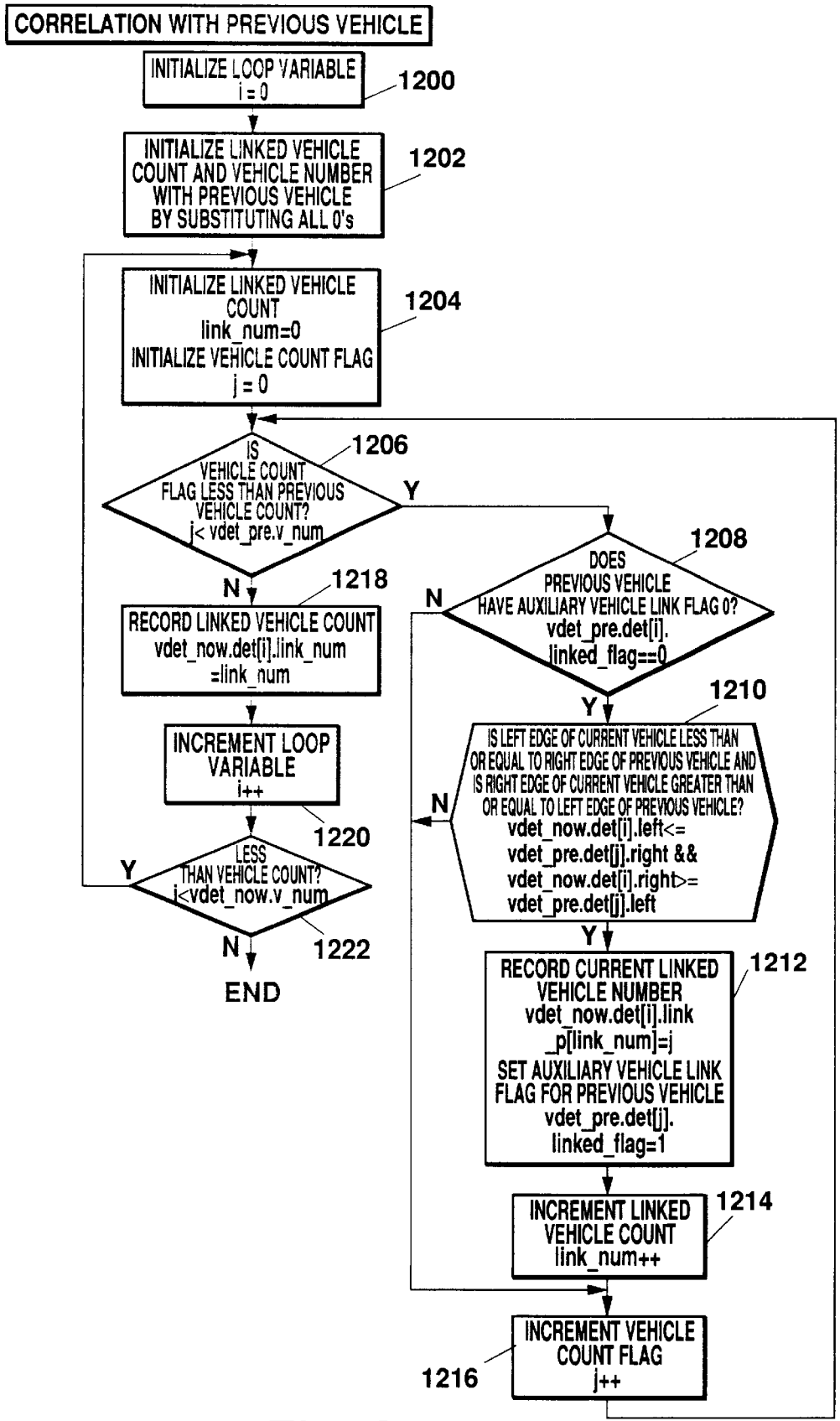
FIG. 27 is a flowchart showing a procedure for a correlation process with previous vehicles in vehicle detection processing.

When the i-th vehicle 18 detected in the current scan is to be linked with a vehicle already detected in a previous scan, vdet_pre.det[i].linked_flag, vdet_now.det[i].link_num, and vdet_now.det[i].link_p [link_num] are used to store information relating to this link. vdet-pre.det[i].linked_flag is an auxiliary vehicle link flag (refer to step 1212 in FIG. 23) that is set according to a detection of this link. vdet_now.det[i].link_num stores the number of previously detected vehicles that are linked with the i-th vehicle 18 detected in the current scan (refer to step 1218 in FIG. 27). vdet_now.det[i].link_p[link_num] stores the numbers of the previously detected vehicles (refer to step 1212 in FIG. 27).

g1) Vehicle Labeling

Figure 25:
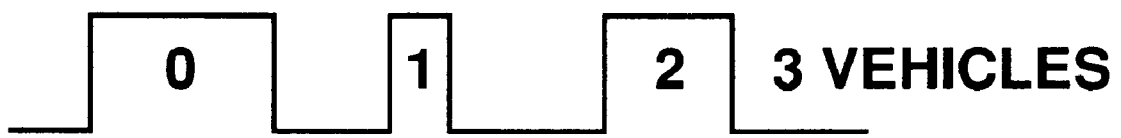
FIG. 25 is a data configuration diagram for conceptually describing a vehicle labeling process in vehicle detection processing.

In the loop starting from step 1002, vehicle detection processor 28 first assigns numbers (labels) in sequence from the left, for example, as shown in FIG. 25 (labeling: 1002), to a value 1 pixel string in array onf[·] that is a result of vehicle detection preprocessor 26 preprocessing ary[·] obtained in the current scan. In the labeling procedure shown in FIG. 26, a value 1 pixel string that should be labeled is detected by detecting a change point in onf[·] along detection line 10 in every scan. The change point mentioned here is a point where a value of onf[·] changes from 0 to 1, or from 1 to 0. Therefore, in a configuration of a system for labeling from the left edge to the right edge of detection line 10, a change point from value 0 to 1 can be considered to correspond to a left edge of vehicle 18, and a change point from value 1 to 0 can be considered to correspond to a right edge of vehicle 18. Thus, by detecting pairs of both change points and labeling the pairs, labeling of vehicles 18 can be executed.

In more detail, vehicle detection processor 28 first executes initialization with the following expressions (1100, 1102):

chg=0, vct=0, i=0

In addition, vehicle detection processor 28 executes processes in steps 1104 to 1114 while successively incrementing loop variable i from 0 to num (number of valid pixels included in onf[·]) and changing the pixel to be processed to the next pixel in sequence along detection line 10 (1116, 1118, 1120).

In steps 1104 and 1110, vehicle detection processor 28 tests the values of change point flag chg and onf[i]. When chg=0 and onf[i]=0 are true, vehicle detection processor 28 considers the currently tested pixel not to comprise a value 1 pixel string continued from the immediately previous pixel, and transfers execution to a process for the next pixel without executing steps 1106, 1108, 1112, and 1114. When chg=0 and onf[i]=1 are true, namely, when left edge i is detected, vehicle detection processor 28 executes processes given in the following expressions (1106, 1108):

vdet_now.det[vct].status=0: Labeling for vct+1-th vehicle 18 vdet_now.det[vct].left=i: Record a left edge for the vct+1-th vehicle 18 chg=1

Subsequently, while chg=1 and onf[i]=1 are true, vehicle detection processor 28 considers that the right edge of vehicle 18 has not yet been detected, and transfers execution to a process for the next pixel without executing steps 1106, 1108, 1112, and 1114. Subsequently, when chg=1 and onf[i]=0 are true, namely, when the right edge i-1 of the vct+1-th vehicle 18 is detected, vehicle detection processor 28 executes processes given in the following expressions (1112, 1114):

vdet_now.det[vct].right=i-1: Record a right edge of the vct+1-th vehicle 18 vct=vct+1 chg=0

Executing these operations for all "num" number of pixels (1120), enables detection of vdet_now.det[·].left and vdet_now.det[·].right for the value 1 pixel strings in the current scan, namely, for the currently detected vehicles, and vdet_now.det[·].status to be initialized to 0. Also, the number of currently detected vehicles vct can be counted. Vehicle detection processor 28 executes the process in the following expression, and passes the result to a subsequent process (1128):

vdet_now.v_num=vct: Stores currently detected vehicle count

However, when vehicle 18 travels on the right edge of the road, i=num and chg=1 may be true, and in such a case (1122), vehicle detection processor 28 executes the processes in the following expressions (1124, 1126) prior to step 1128:

vdet_now.det[vct].right=num-1: Provisionally setting for right edge vct=vct+1

Vehicle detection processor 28 next tests whether vdet_now.v_num=0 and vdet_pre.v_num=0 are true (step 1004 in FIG. 23). vdet_pre.v_num is a variable supplying the number of previously detected vehicles, and is stored as vdet_now.v_num when previous step 1020 is executed. If the test is true, it is not necessary to execute subsequent processes so vehicle detection processor 28 immediately transfers execution to step 1022, stores vdet_now.det[i].main_cmd, returns to step 1002, and waits for the next data.

g2) Correlation with Previous Vehicles

When vdet_now.v_num≠0 or vdet_pre.v_num≠0 is true (1004), it is assumed that one or more vehicles 18 have been detected in a previous and/or current scan, so vehicle detection processor 28 correlates a value 1 pixel string in the previous data and a value 1 pixel string in the current data in a one-to-one relationship (1006). However, strictly speaking, it is not a one-to-one correlation since there are entering vehicles described later, for example. This correlation is achieved in a procedure given in FIG. 27.

The procedure given in FIG. 27 comprises a nesting of loop 1206 to 1216 using j as a loop variable, in loop 1204 to 1222 using i as a loop variable. This sort of structure is employed to collectively verify and detect links for vdet_now.v_num number of value 1 pixel strings in the current data with respective vdet-pre.v_num number of value 1 pixel strings in the previous data. i and j are both used to specify a value 1 pixel string to be detected for the existence of a link, in particular, i specifies a label of a value 1 pixel string in the current data and j specifies a label of a value 1 pixel string in the previous data. In other words, loop 1204 to 1222 to be executed after an initialization process of i=0 (1200) is a loop that increments i by 1 in sequence from 0 to vdet_now.v_num (1220, 1222) and executes steps 1204 to 1220, and loop 1206 to 1216 to be executed after an initialization process of j=0 (1204) is a loop that increments j by 1 in sequence from 0 to vdet_pre.v_num (1206, 1216) and executes steps 1208 to 1214.

When executing this procedure, vehicle detection processor 28 executes an initialization process (1202) given in the following expression prior to loop 1204 to 1222.

vdet_now.det[·].link_num=0 vdet_now.det[·].link_p[·]=0 vdet_pre.det[·].linked_flag=0

As will be described later, vdet-pre.det[·].linked_flag is used (1208) as a flag to remove value 1 pixel strings in the previous data that have already been correlated with value 1 pixel strings in the current data from further correlation processing. Vehicle detection processor 28 also executes an initialization in the following expression together with the initialization of j. link_num is a variable (1214) for counting the linked vehicles.

link_num=0

Figure 28:
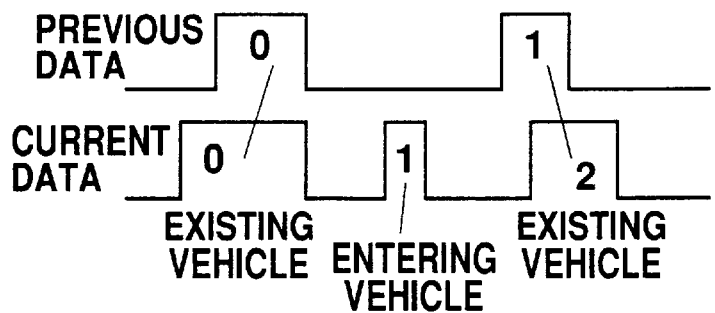
FIG. 28 is a data configuration diagram for conceptually describing the correlation process with previous vehicles in vehicle detection processing.

To describe the procedure given in FIG. 27 more specifically, the data shown in FIG. 28 is assumed as an example. The previous data shown in the figure assumes vdet_pre.v_num=2, and labels of 0 and 1 are assigned to the value 1 pixel strings in the scan in sequence from the left edge of the road along detection line 10. Also, the current data in the same figure assumes vdet_now.v_num=3, and labels of 0, 1, and 2 are assigned to the value 1 pixel strings in the scan in sequence from the left edge of the road along detection line 10. Furthermore, the number 0 value 1 pixel string in the previous data and the number 0 value 1 pixel string in the current data both occupy mutually overlapping positions, and the number 1 value 1 pixel string in the previous data and the number 2 value 1 pixel string in the current data both occupy mutually overlapping positions.

When the procedure given in FIG. 27 is executed for the data shown in FIG. 28, initialization processes are first executed by steps 1200 to 1204, resulting in j=0. Next, step 1206 tests whether j<vdet_pre.v_num is true, which is the case here. Step 1208, which is executed when the test is true, tests whether vdet_pre.det[·].linked_flag=0 is true, and it is true here since vdet_pre.det[·].linked_flag has been initialized previously in step 1202.

Step 1210, which is executed when the test is true, tests
vdet_now.det[i].left≦vdet_pre.det[j].right and
vdet_now.det[i].right≧vdet_pre.det[j].left
This step tests whether a position of a value 1 pixel string in the previous data and a position of a value 1 pixel string in the current data at least partially overlap. In the example of FIG. 28, the test in step 1210 is true since the number j=0 value 1 pixel string in the previous data and the number i=0 value 1 pixel string in the current data occupy a partially overlapping position. According to the truth of this test condition, namely, the detection of a correlation between both value 1 pixel strings, vehicle detection processor 28 records number j=0 of the value 1 pixel string in the previous data (1212). In other words, a process in the following expression is executed:
vdet_now.det[i].link_p[link_num]=j
vdet_now.det[i].link_p[link_num] is a variable for storing the number of a value 1 pixel string corresponding to vehicle 18 positioned at the extreme left on detection line 10 among value 1 pixel strings in the previous data and to be linked with an i-th value 1 pixel string in the current data (1212). Note that, at this time, i=0, link_num=0, and j=0.

Furthermore, in this step, a process in the following expression is executed:
vdet_pre.det[j].linked_flag=1
In other words, vdet_pre.det[j].linked_flag is used as a flag to indicate that a value 1 pixel string to be linked with the number j=0 value 1 pixel string in the previous data was already detected from the current data in step 1210. In succeeding steps 1214 and 1216, processes in the following expressions are executed, respectively (link_num=1, j=1):
link_num=link_num+1: 1214
j=j+1: 1216
The operation of vehicle detection processor 28 subsequently returns to step 1206. At this time, the test in step 1206 is true as in the previous test, and the test in succeeding step 1208 becomes false since vdet_pre.det[0].linked_flag=1 has been executed in prior step 1212. As a result, steps 1210, 1212, and 1214 are skipped, and j=j+1 in step 1216 is executed (link_num=1, j=2). Subsequently, the operation of vehicle detection processor 28 again returns to step 1206. Again, the test in step 1206 is true and the test in step 1208 becomes false. As a result, steps 1210, 1212, and 1214 are skipped and step 1216 is executed (link_num=1, j=3). Subsequently, since the test in step 1206 is false when the execution returns to step 1206, vehicle detection processor 28 executes a process of vdet_now.det[i].link_num=link_num to record (1218) the linked vehicle count (in this case 1) stored in link_num. Vehicle detection processor 28 executes i=i+1 (1220, i=1), then step 1222, and returns execution to step 1204.

When the same processes are also executed for value 1 pixel strings in the current data where i=1 and i=2, i<vdet_now.v_num in step 1222 is true and the process shown in FIG. 27 ends. At this point, the following types of vehicle correlation data are obtained for the current data shown in FIG. 28. These data are passed on to subsequent processes.
Value 1 pixel string for i=0: vdet_now.det[0].link_num=1
vdet_now.det[0].link_p[0]=0
Value 1 pixel string for i=1: vdet_now.det[1].link_num=0
Value 1 pixel string for i=2: vdet_now.det[2].link_num=1
vdet_now.det[2].link_p[0]=1 g3) Vehicle Information Creation

Vehicle detection processor 28 next creates vehicle information for entering vehicles, existing vehicles, and corrected/deleted vehicles, respectively (1008 in FIG. 23). The entering vehicles mentioned here refer to vehicles 18 that were detected in the current scan yet not detected in the previous scan, namely, vehicles 18 that newly entered onto detection line 10. In this embodiment, pixel strings, such as the value 1 pixel string for i=0 in FIG. 28, having positions that do not overlap at all with positions of any value 1 pixel strings in the previous data are regarded as value 1 pixel strings corresponding to entering vehicles. The existing vehicles mentioned here refer to vehicles 18 that were detected in the current scan in continuation from the previous scan, namely, vehicles 18 that had existed on detection line 10 at least in both the previous and current scans. In this embodiment, pixel strings, such as value 1 pixel strings for i=0 and i=2 in FIG. 28, having positions that overlap at least partially with positions of any value 1 pixel strings in the previous data are regarded as value 1 pixel strings corresponding to existing vehicles.

Figure 29:
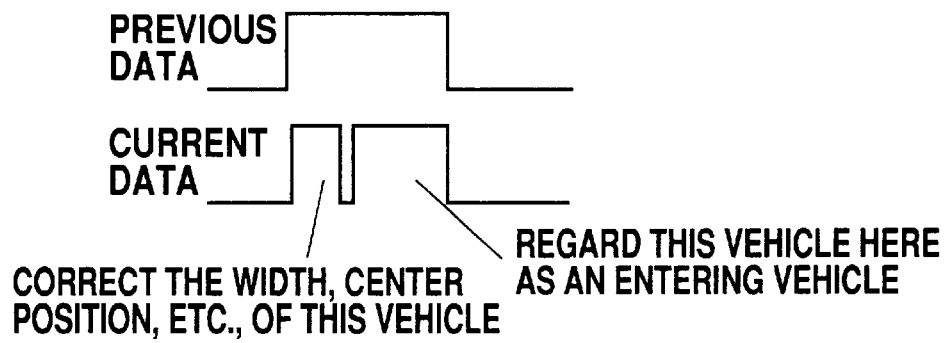
FIG. 29 is a data configuration diagram for describing a corrected vehicle.

Furthermore, there are also vehicles that are not suited for handling in the same manner as ordinary existing vehicles, even though they are equivalent in form to existing vehicles. For example, when a single value 1 pixel string in the previous data, as shown in FIG. 29, is linked with multiple value 1 pixel strings in the current data, the handling of the multiple value 1 pixel strings in the current data as existing vehicles is inappropriate, while the handling of one string (having the lowest number in the procedure in FIG. 26 and in a procedure in FIG. 31 to be described later, and shown on the left edge in FIG. 29) as an existing vehicle and the remaining string as an entering vehicle is appropriate. Since this existing vehicle requires considerable correction with regard to data on its width, center position, and so forth, it is distinguished from an ordinary existing vehicle and called a corrected vehicle (hereinafter, the meaning of existing vehicles excludes corrected vehicles). The relevant handling facilitates a more preferred separation and detection of a bus and a motorcycle traveling side by side at close proximity.

Figure 30:
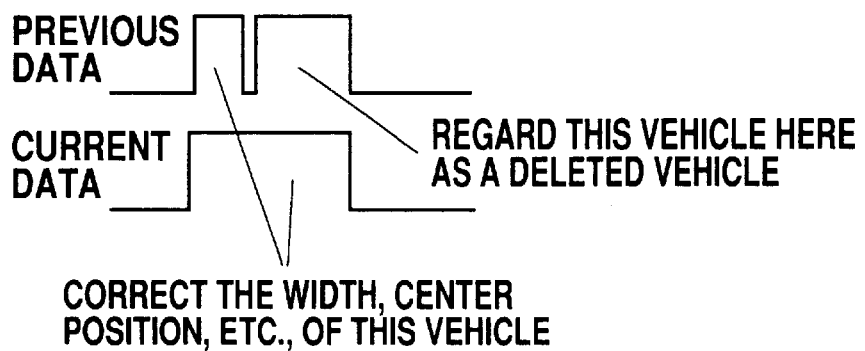
FIG. 30 is a data configuration diagram for describing a corrected/deleted vehicle.

Also, when multiple value 1 pixel strings in the previous data are linked with a single value 1 pixel string in the current data as shown in FIG. 30, the single value 1 pixel string in the current data assumes one of the multiple value 1 pixel strings in the previous data (a procedure in FIG. 34 to be described later selects from an earliest scan, namely, the first vehicle entering detection line 10., and this is shown on the left edge in FIG. 30) is an existing corrected vehicle.

Since the remainder among the multiple value 1 pixel strings in the previous data must be deleted at the end of the previous scan from the data, it is called a deleted vehicle. The relevant handling facilitates a more accurate detection of vehicle 18 having a complex front end profile as one vehicle 18.

Figure 31:
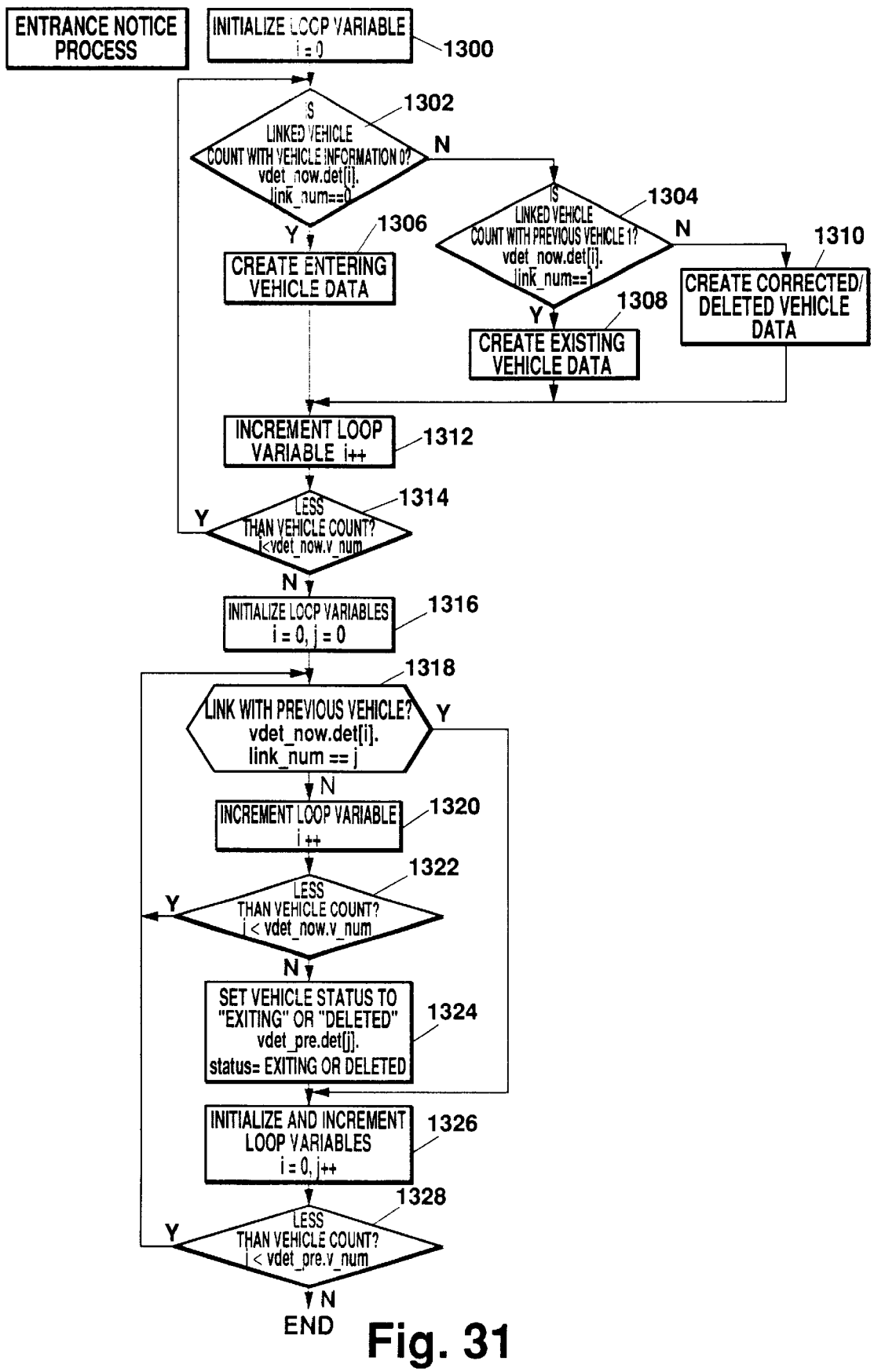
FIG. 31 is a flowchart showing a procedure for a vehicle information creation process in vehicle detection processing.

When creating vehicle information, vehicle detection processor 28 executes processes in steps 1302 to 1310 while executing i=i+1 (1312) from i=0 to i=vdet_now.v_num (1300, 1314) as shown in FIG. 31. When executing steps 1302 to 1310, vehicle detection processor 28 uses vdet_now.det[·].link_num and classifies vehicle 18 detected in the current scan as an entering vehicle, existing vehicle, or corrected/deleted vehicle (1302, 1304). As is apparent from the expressions mentioned at the end of the description on the correlation process for the example in FIG. 28, this classification is performed using the fact that vdet_now.det[·].link_num=0 (1302) is true for entering vehicles and vdet_now. det[·].link_num=1 (1304) is true for existing vehicles.

When the i-th value 1 pixel string in the current data is judged and classified as corresponding to an entering vehicle, vehicle detection processor 28 executes processes given in a listing in FIG. 32, and substitutes the result for the above-mentioned detected vehicle data storing scheme to create entering vehicle data (1306). This process yields variables that were not obtained in the procedures given in FIG. 26 and FIG. 27. With regard to the other variables, their values obtained in the procedures given in FIG. 26 and FIG. 27 are substituted for the detected vehicle data storing scheme. "ENTERING" and "FOR WHEN ENTERING" denotes values having their respective meanings. The created entering vehicle data is supplied as vehicle information to subsequent notice and storage processes (1012, 1020 in FIG. 23).

Also, when the i-th value 1 pixel string in the current data is judged and classified as corresponding to an existing vehicle, vehicle detection processor 28 executes processes given in a listing in FIG. 33, and substitutes the result for the above-mentioned detected vehicle data storing scheme to create existing vehicle data (1308). In FIG. 33, "PREVIOUS VALUE" refers to corresponding data obtained in a previous scan, "CURRENT WIDTH" and "CURRENT CENTER POSITION" refer to a width and a center position determined from the current data, and the width determined from the current data or a left edge or right edge in the current data are compared in "COMPARISON WITH PREVIOUS VALUE". Also, when creating existing vehicle data with regard to variables obtained in the procedures given in FIG. 26 and FIG. 27, their values are substituted for the detected vehicle data storing scheme. vdet_pre.det[i].status is used in an exit process to be described later. vdet_pre.det[i].line_num represents data stored in vdet_now.det[i].line_num by the previous scan for the i-th value 1 pixel string. The created existing vehicle data is supplied as vehicle information to a subsequent storage process (1020 in FIG. 23).

When the i-th value 1 pixel string in the current data is judged and classified as not being either an entering vehicle or an existing vehicle, the value 1 pixel string is considered to be a corrected vehicle or deleted vehicle so vehicle detection processor 28 executes a procedure given in FIG. 34 (1310). With regard to the i-th value 1 pixel string that was judged and classified as not being either an entering vehicle or an existing vehicle among the value 1 pixel strings in the current data, the procedure given in FIG. 34 includes, in general, 1. A process (1400 to 1414) for searching for a value 1 pixel string indicating the earliest vehicle taking the lead to enter onto detection line 10 from among value 1 pixel strings in the previous data that links to the i-th value 1 pixel string in the current data, and detecting its number "first,"

2. A process (1416) for correcting vehicle information relating to the first-th value 1 pixel string in the previous data according to data relating to the i-th value 1 pixel string in the current data, and substituting for detected vehicle data storing scheme, and 3. A process (1418 to 1426) for setting a vehicle status to "deleted" with regard to a value 1 pixel string among value 1 pixel strings (except the first-th one) in the previous data that links to the i-th value 1 pixel string in the current data.

The relevant procedures achieve the processes in FIG. 30.

When executing process 1, vehicle detection processor 28 first initializes temporary vehicle length parameter line_num and loop variable j to 0 (1400, 1402). Here, a count of value 1 pixel strings in the previous data that link with the i-th value 1 pixel string in the current data, and their numbers has been stored in vdet_now.det[i].link_num and vdet_now. det[i].link_p[j], respectively (refer to the expressions given at the end of g2), and a length of a vehicle related to a number vdet_now.det[i].link_p[j] value 1 pixel string have been stored in vdet_pre.det[vdet_now. det[i].link_p[j]].line_num (refer to the description regarding step 1308 in FIG. 31). In process 1, while incrementing j in succession (1412) until j=vdet_now.det[i].link_num (1414), a maximum value of vdet_pre.det[link_p]. line_num is detected (1406, 1408) with regard to the i-th value 1 pixel string in the current data. link_p is a temporary vehicle length parameter (1404) for storing vdet_now.det[i].link_p[j]. Vehicle detection processor 28 detects number link_p where vdet_pre.det[link_p].line_num is largest using variable "first" (1410), and passes this on to process 2. In process 2, vehicle information relating to the first-th value 1 pixel string in the previous data is corrected according to data relating to the i-th value 1 pixel string in the current data, and substituted for detected vehicle data storing scheme.

When executing process 3, vehicle detection processor 28 initializes loop variable j to 0 (1418), then while incrementing j in succession (1424) to j=vdet_now.det[i].link_num (1426), searches for value 1 pixel strings except the first-th string (1420) from among vdet_now.det[i].link_num number of value 1 pixel strings, and executes a process (1422) of vdet_pre.det[vdet_now. det[i].link_p[j].status=DELETED with regard to the vehicle status for the value 1 pixel strings.

In a vehicle information creation procedure shown in FIG. 31, after j=vdet_now.det[i].link_num is detected in step 1314, a process for detecting exiting vehicles (vehicle 18 newly exiting detection line 10 in the current scan) is executed. In other words, after initializing both loop variables i and j to 0 (1316), vehicle detection processor 28 searches for value 1 pixels in the previous data that are not linked to any value 1 pixel strings in the current data (1318 to 1324) while incrementing j in succession from j=0 to j=vdet_pre.v_num (1326, 1328). During search, the truth of vdet_now.det[i].link_num=j is tested (1318) while i is incremented in succession from i=0 to i=vdet_now.v_num (1320, 1322).

This expression is true when the j-th value 1 pixel string in the previous data has been linked to the i-th value 1 pixel string in the current data. When a link with any value 1 pixel string in the current data is detected by the truth of test condition in step 1318, vehicle detection processor 28 initializes loop variable i to 0 and increments loop variable j by 1 through step 1326, and transfers execution to a process relating to the next value 1 pixel string in the previous data. Conversely, when the test condition in step 1318 is false for each of the value 1 pixel strings in the current data and a link cannot be detected, vehicle detection processor 28 sets vdet_pre.det[j].status=EXITING with regard to the j-th value 1 pixel string in the previous data (1324), and transfers execution to step 1326.

vdet_pre.det[j].status represents a vehicle status for the j-th value 1 pixel string in the previous data, and is a value that was detected and stored as vdet_now.det[j].status during the previous scan. This sort of process enables vehicle 18 to be detected as an exiting vehicle when the vehicle was not detected in the current scan at a position where an existing or entering vehicle was detected in the previous scan.

Vehicle detection processor 28 simultaneously executes a mirror separation and elimination process. In other words, when a condition, is true, such as vdet_pre.det[i]. right-vdet_pre.det[i].left≦4 pixels or
vdet_pre.det[i].add_width/vdet_pre. det[i].line_num≦4 pixels indicating a width or mean width of the j-th value 1 pixel string in the previous data is small, the following expression vdet_pre.det[j].status=DELETED is set in step 1324. In the expressions above, vdet_pre.det[i].right, vdet_pre.det[i].left, vdet_pre.det[i].add_width, and vdet_pre.det[i].line_num are values that were detected and stored as vdet_now.det[i].right, vdet_now.det[i].left, vdet_now.det[i].add_width, and vdet_now.det[i].line_num during the previous scan. Since this sort of process enables a vehicle indicated as an exiting vehicle and having a narrow width or mean width to be handled as a deleted vehicle, the risk of detecting and notifying for a mirror, which protrudes from the side of a bus or truck, separately from the main body of vehicle 18, can be reduced.

g4) Notice Process

Vehicle detection processor 28 notifies the host system of created vehicle information by supplying the vehicle information to detection result transmission processor 30 (1012 to 1018 in FIG. 23), stores vehicle information regarding the current scan to an internal storage device (1020), stores (1022) an operation command (equivalent to vdet_now.det[i].main_cmd) from the host system acquired in step 1020 (or stored in previous step 1022), and returns execution to step 1002. However, when an antenna system (not shown) is not executing a debiting process against currently passing vehicle 18 (1010), vehicle detection processor 28 skips steps 1012 to 1018. Since there is a possibility of the debiting process for the previous scan being executed at the same time point in the current scan, vehicle detection processor 28 executes a forcible deletion process (1026), such as for stopping scans, and transfers execution to step 1020 when the debiting process is being performed for the previous scan (1024) even when the debiting process is not currently being performed.

As shown in FIG. 23, the notice processes for vehicle information can be executed in a sequence of notices regarding entering vehicles (1012), notices regarding exiting vehicles (1014), notices regarding corrected vehicles (1016), and notices regarding deleted vehicles (1018). These notice processes are executed by supplying detected vehicle data notice scheme data (notice data) ddet->~as defined by typedef struct{. . . }_DETECT in FIG. 35 to detection result transmission processor 30.

Among the notice data, ddet->vno, ddet->left, ddet->right, ddet->min_width, ddet->max_width, and ddet->passed-time respectively correspond to vdet_now.det[i].vehcle_no, vdet_now.det[i].left, vdet_now.det[i].right, vdet_now.det[i].min_width, vdet_now.det[i].max_width, and vdet_now.det[i].passed_time, and are substituted for the latter when executing steps 1504 (FIG. 36), 1804 (FIG. 39), and 1904 (FIG. 41) to be described later. Among the remaining notice data, ddet->mean_width and ddet->mean_center can be respectively determined from ddet->mean_width=vdet_now.det[i]. add_width/vdet_now.det[i].line_num ddet->mean_center=vdet_now.det[i]. add_center/vdet_now.det[i].line_num The substitution of variables having a format of vdet_pre.~, instead of variables having a format of vdet_now.~, for the ddet->~ variables in the detected vehicle data notice scheme or their calculations in step 1804 are used because step 1804 relates to exit notice processes and it is necessary to handle the previous data. Furthermore, ddet->date is created by a separate clock.

g4.1) Entrance Notice Process

Figure 36:
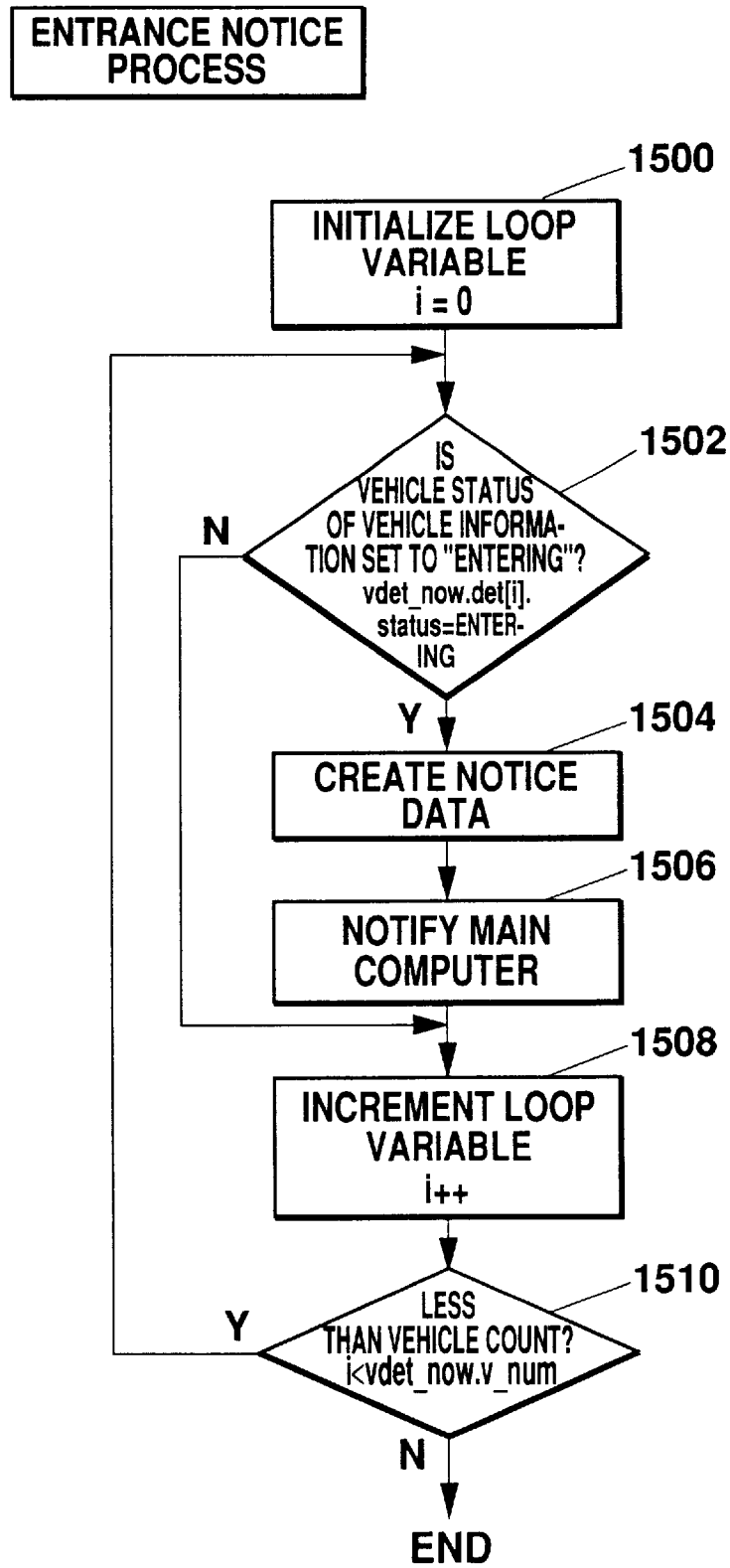
FIG. 36 is a flowchart showing a procedure for an entrance notice process in vehicle detection processing.

The notice process in step 1012 is executed in a procedure given in FIG. 36. In the procedure given in this figure, loop variable i is first initialized to 0 (1500), then while i is incremented in succession (1508) to i=vdet_now.v_num, namely, for all vehicles 18 detected in the current scan (1510), and vdet_now.det[i].status=ENTERING is tested whether true or false, namely, whether the vehicle undertest is an entering vehicle in the current scan or not (1502). If the test indicates an entering vehicle, vehicle detection processor 28 creates notice data (1504) based on the data (vehicle information) created in step 1008 in FIG. 23 (in this case, essentially step 1306 in FIG. 31). In other words, vehicle detection processor 28 substitutes the values of the various vdet_now.~ variables in the detected vehicle data storing scheme, or values obtained from them, for the various corresponding ddet->~ variables in the detected vehicle data notice scheme. Vehicle detection processor 28 supplies the created notice data to detection result transmission processor 30 and notifies the host system (1506).

g4.2) Exit Notice Process

Figure 37:
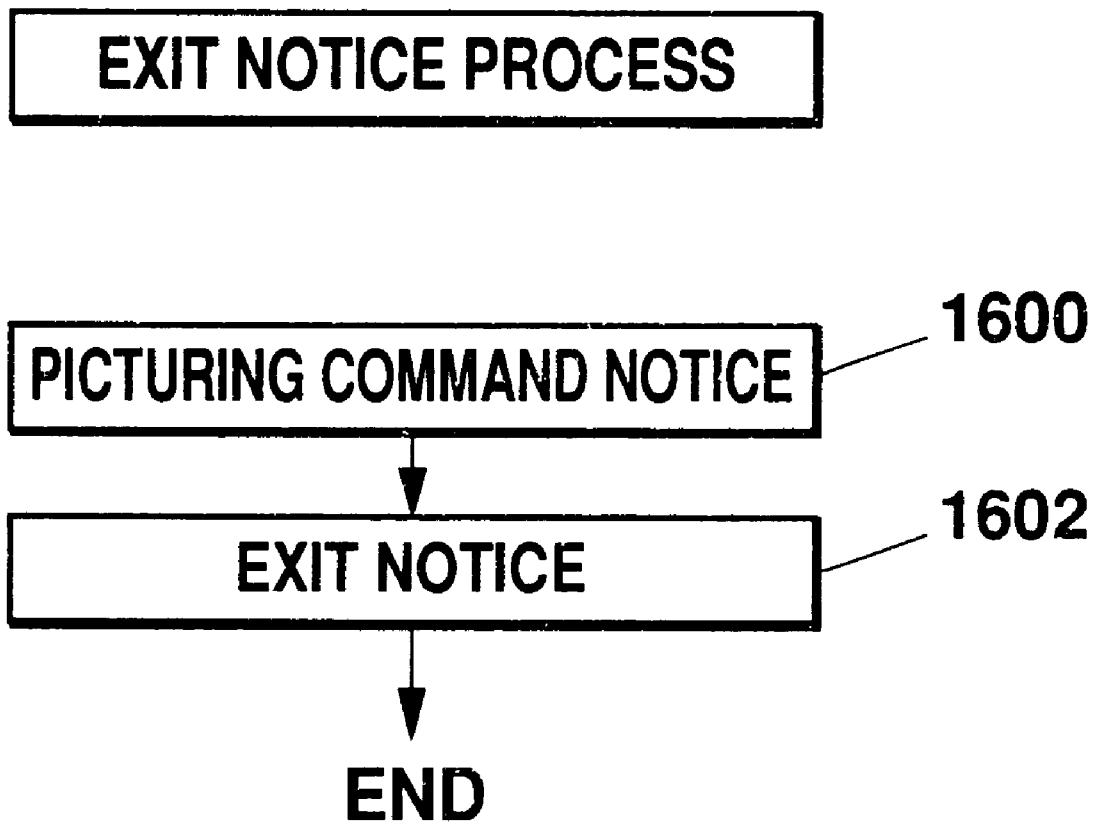
FIG. 37 is a flowchart showing a procedure for an exit notice process in vehicle detection processing.

The notice process by step 1014 is executed in a procedure given in FIG. 37. In the procedure given in this figure, a picturing command notice process (1600) for sending a picturing command to the camera system with respect to vehicle 18 among exiting vehicles that has not had its license number plate, for example, photographed as of the previous scan, and an exit notice process (1602) for detection result transmission processor 30 notifying the host system of data regarding the exiting vehicle are executed. The picturing command notice and exit notice processes are executed in procedures given in FIG. 38 and in FIG. 39, respectively.

Figure 38:
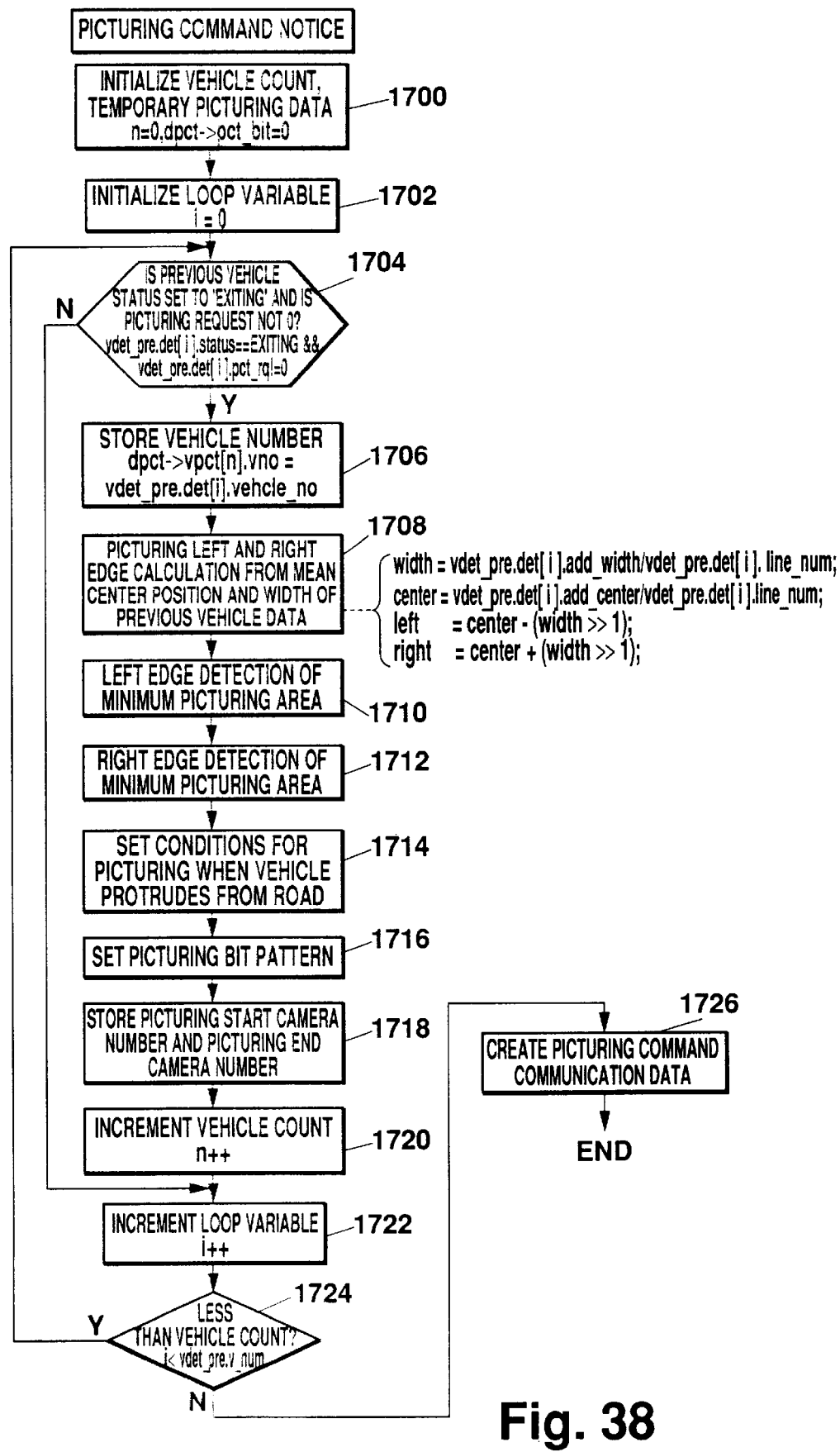
FIG. 38 is a flowchart showing a procedure for a picturing command notice in the exit notice process.

When initiating the procedure given in FIG. 38, vehicle detection processor 28 initializes, among the data in the picturing command notice scheme defined in a listing in FIG. 40, both a picturing vehicle count dpct->vpct_num (denoted as n in the figure) and a picturing bit pattern dpct->pct_bit to 0 (1700). Both dpct->vpct_num and dpct->pct_bit are included in typedef struct{. . . }_PCT_INF in the expressions above, and included in a part that is created in every scan. This scheme further includes a part that is created for each vehicle to be photographed as defined in typedef struct{. . . }_V_PCT_INF in the expressions above. The part that is created for each vehicle to be photographed includes dpct->vpct[·].vno, dpct->vpct[·]

.start_cam.no, and dpct->vpct[·].end_cam.no to be described later. Vehicle detection processor 28 executes the following loop processes that are to create data comprising the picturing command notice scheme.

The loop processes that vehicle detection processor 28 executes searches, among a vdet_pre.v_num number of vehicles 18 detected in the previous scan (where vdet_pre.v_num is a value detected and stored as vdet_now.v_num during the previous scan), for exiting vehicles that have not had their license number plates photographed as of the previous scan and that have departed from detection line 10 as of the previous scan. In other words, vehicle detection processor 28 initializes loop variable i to 0 (1702), then tests the truth of vdet_pre.det[i].status=EXITING and
vdet_pre.det[i].pct_rq≠0 in succession (1704) while incrementing i in succession (1722) until i=vdet_pre.v_num is true (1724). In this expression, vdet_pre.det[i].status has a value set during the execution of step 1324, and vdet_pre.det[i].pct_rq has a value detected and stored as vdet_now.det[i].pct_rq during the previous scan. The former represents the vehicle status (such as whether exiting or not), and the latter represents the existence of the picturing command (0 indicates "none"). Therefore, the test condition in step 1704 is true if the i-th vehicle 18 in the previous scan is a vehicle 18 that has not had its license plate number photographed as of the previous scan (strictly speaking, has not had the picturing command issued for it) among exiting vehicles that have departed from detection line 10 as of the previous scan.

When the test condition in step 1704 is true, vehicle detection processor 28 stores number vdet_pre.det[i].vehcle_no of the i-th vehicle 18 in the previous scan into dpct->vpct[n].vno (1706), then determines mean values "width" and "center" for the width and center of the i-th vehicle 18 based on the following expressions width=vdet_pre.det[i]. add_width/vdet_pre.det[i].line_num
center=vdet_pre.det[i]. add_center/vdet_pre.det[i].line_num and sets (1708) a left edge "left" and a right edge "right" of the picturing area for the camera (not shown) using "width" as a guide, according to, for example, the following expressions left=center−width
right=center+width Vehicle detection processor 28 further detects, in a picturing area set by left edge "left" and right edge "right", a left edge and right edge of a minimum area that must be photographed (1710, 1712), sets picturing conditions in the event vehicle 18 protrudes from the road (1714), sets picturing bit pattern dpct->pct_bit (1716), and stores the number of the camera starting a picturing operation and the number of the camera ending the picturing operation into dpct->vpct[·].start_cam.no and dpct->vpct[·].end_cam.no, respectively (1718). Vehicle detection.processor 28 increments n, namely, dpct->vpct[·].vno, by 1 (1720), then transfers execution to step 1722. After completing the above-mentioned processes for all vdet_pre.v_num number of vehicles 18 detected in the previous scan, vehicle detection processor 28 configures the picturing command notice scheme (1726) from various variables obtained in the relevant processes.

Figure 41:
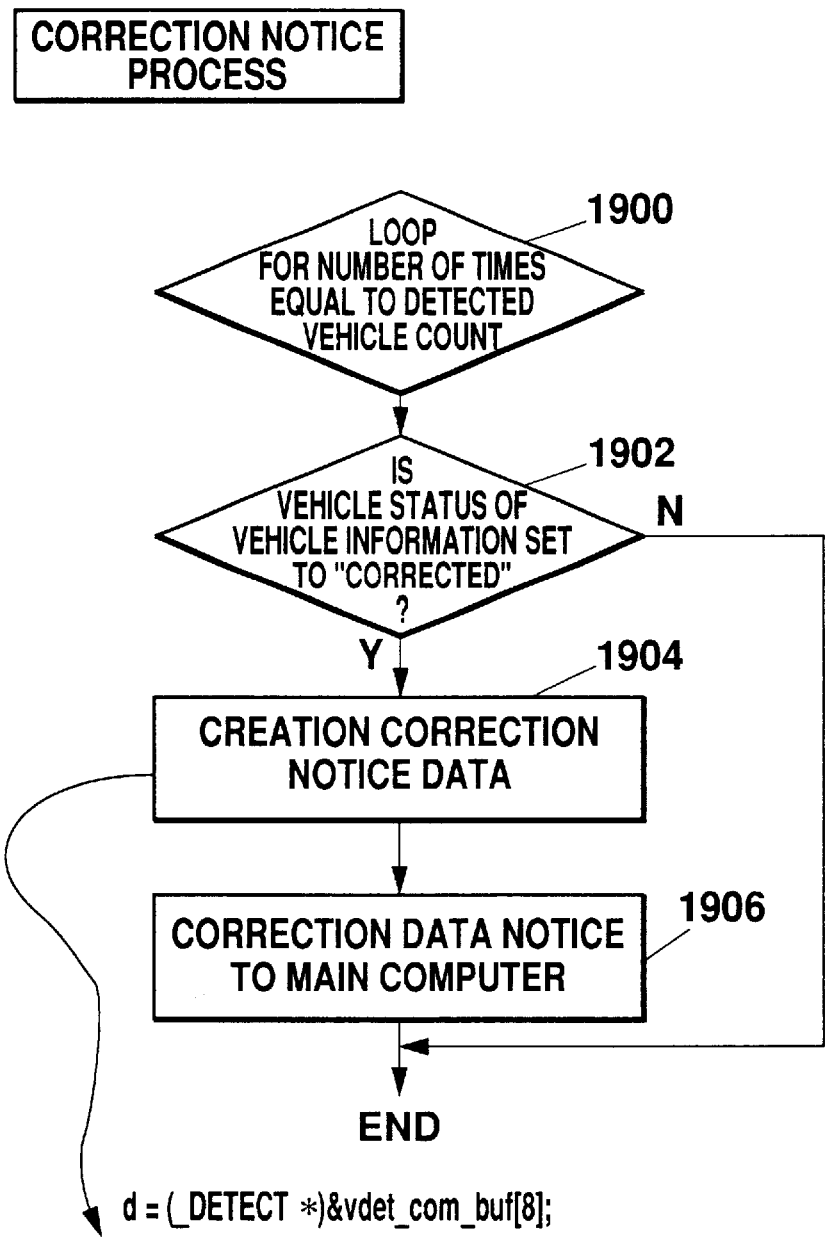
FIG. 41 is a flowchart showing a procedure for a correction notice process in vehicle detection processing.
Figure 42:
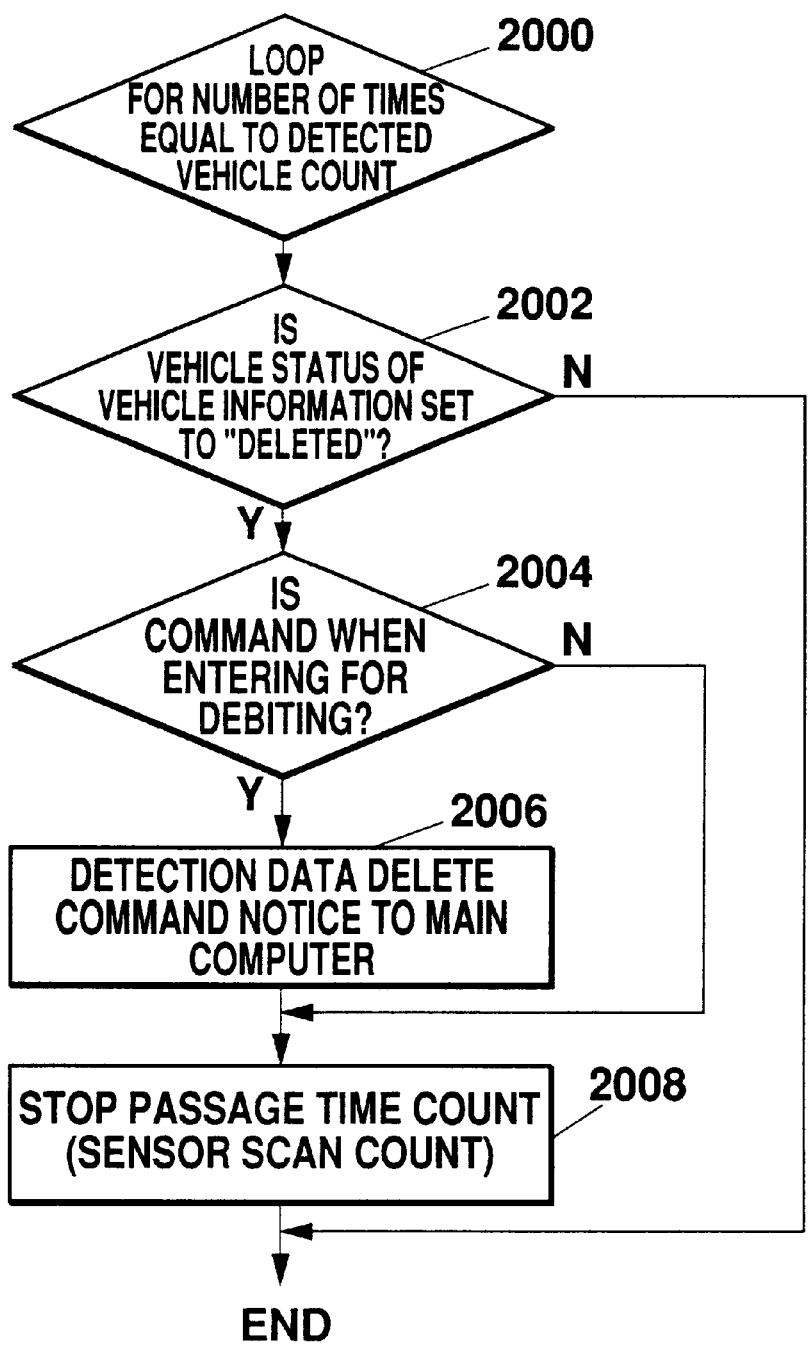
FIG. 42 is a flowchart showing a procedure for a deletion notice process in vehicle detection processing.

In a procedure shown in FIG. 39, vehicle detection processor 28 repeats processes from step 1802 for a number of times equal to the number of vehicles 18 detected in the previous scan (1800). In these repetitive processes, when vdet_pre.det[i].status=EXITING is true (1802) with regard to the vehicle status of vehicle 18 to be processed (number: i), vehicle detection processor 28 creates exit notice data for vehicle 18 (1804), and notifies the host system (main computer) from detection result transmission processor 30 (1806). Contents of the exit notice data to be created are given as follows:

ddet->vno=vdet_pre.det[i].vehcle_no
ddet->date=0
ddet->left=vdet_pre.det[i].min_left
ddet->right=vdet_pre.det[i].max_right
ddet->min_width=vdet_pre.det[i].min_width
ddet->max_width=vdet_pre.det[i].max_width
ddet->mean_width=vdet_pre.det[i].add_width/vdet_pre.det[i].line_num
ddet->mean_center=vdet_pre.det[i]. add_center/vdet_pre.det[i].line_num
ddet->passed_time=vdet_pre.det[i].passed_time g4.3) Correction Notice Process During notification of vehicle information regarding a corrected vehicle (1016 in FIG. 23), vehicle detection processor 28 repeats processes from step 1902, as shown in FIG. 41, for a number of times equal to the number of vehicles 18 detected in the current scan (1900). In these repetitive processes, when vdet_now.det[i].link_num>1 and vdet_now.det[i].status≠DELETED is true (1902) with regard to vehicle 18 to be processed (number: i), vehicle detection processor 28 creates correction notice data for the vehicle 18 (1904), and notifies the host system from detection result transmission processor 30 (1906). Contents of the correction notice data to be created are given as follows:

ddet->vno=vdet_now.det[i].vehcle_no
ddet->date=0
ddet->left=vdet_now.det[i].min_left
ddet->right=vdet_now.det[i].max_right
ddet->min_width=vdet_now. det[i].min_width
ddet->max_width=vdet_now. det[i].max_width
ddet->mean_width=vdet_now. det[i].add-width/vdet_now.det[i].line_num
ddet->mean_center=vdet_now. det[i].add_center/vdet_now.det[i].line_num
ddet->passed_time=vdet_pre.det[i].passed_time g4.4) Deletion Notice Process During notification of vehicle information regarding a deleted vehicle (1018 in FIG. 23), vehicle detection processor 28 repeats processes from step 2002, as shown in FIG. 42, for a number of times equal to the number of vehicles 18 detected in the current scan (2000). In these repetitive processes, when vdet_now.det[i].status=DELETED is true (2002) and the command which was issued when the vehicle 18 was entered now executes a debiting process (2004) with regard to the vehicle 18 to be processed (number: i), vehicle detection processor 28 notifies the host system of a deletion command with regard to vehicle 18 from detection result transmission processor 30 (2006), and stops the passage time calculation operation (2008) with regard to vehicle 18. If the command when entering is not executing the debiting process, vehicle detection processor 28 skips step 2006.

g4.5) Forcible Deletion Process

Figure 43:
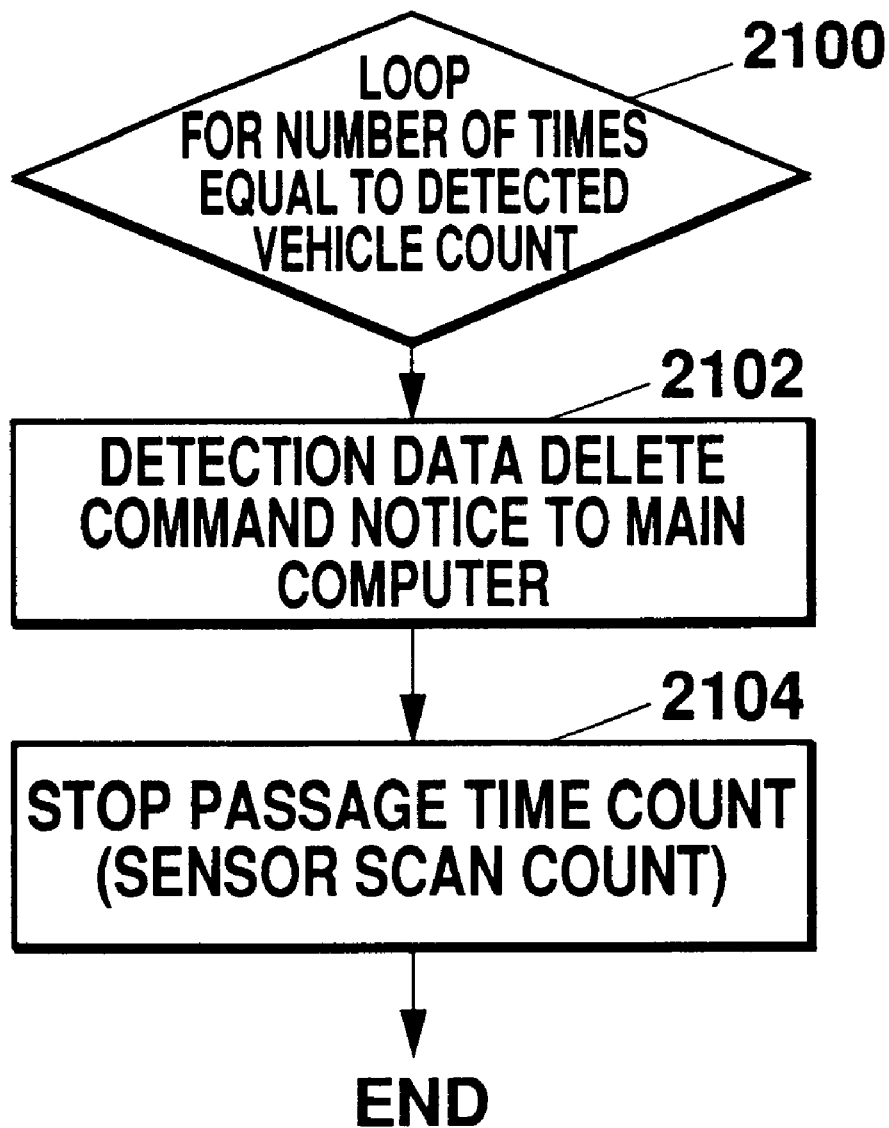
FIG. 43 is a flowchart showing a procedure for a forcible deletion process in vehicle detection processing.

During execution of forcible deletion process (1026 in FIG. 23), vehicle detection processor 28 repeats processes from step 2102, as shown in FIG. 43, for a number of times equal to the number of vehicles 18 detected in the current scan (2100). In these repetitive processes, vehicle detection processor 28 notifies the host system of the deletion command with regard to the vehicle 18 to be processed from detection result transmission processor 30 (2102), and stops the passage time calculation operation (2104) with regard to vehicle 18.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A moving object detection method including:

a step for detecting existence of a moving object at a plurality of positions on a predetermined line by (i) arranging a plurality of distance sensors facing a single direction for scanning said predetermined line in said direction, (ii) scanning said predetermined line in said direction, each sensor producing an output signal indicative of the distance to said moving object in said direction, (iii) binarizing said output signals to produce 0/1 data bits, and (iv) linking said 0/1 data bits according to an order of arrangement of said sensors for producing a bit string, whereby said bit string is representative of existence and position of said moving object along said predetermined line;

a step for filtering the bit string with filtering characteristics determined according to an essential profile of the moving object and/or the bit string obtained in a previous period; and a step to periodically execute said detecting and filtering steps.

2. A moving object detection apparatus comprising:

a plurality of distance sensors arranged to face a single direction for periodically scanning a plurality of positions on a predetermined line in said single direction, each sensor producing an output signal thereby;

means for binarizing said output signals according to an order of arrangement of said sensors to produce 0/1 data bits indicative of existence of said moving object at each sensor position;

means for linking said 0/1 data bits at each sensor position to produce a bit string representative of existence and position of said moving object along said predetermined line; and filtering means for filtering the bit string obtained from the sensor in a certain period with filtering characteristics determined according to an essential profile of the moving object and/or the bit string obtained from the sensor in a previous period.

3. A moving object detection apparatus comprising:

a sensor for periodically detecting existence of the moving object at a plurality of positions on a predetermined line by scanning said predetermined line;

filtering means for filtering the moving object existence information obtained from the sensor in a certain period with filtering characteristics determined according to at least one of an essential profile of the moving object and the moving object existence information obtained from the sensor in a previous period; and wherein said filtering characteristics include a width maintaining characteristic for correcting, when a plurality of mutually adjacent third positions for which moving object existence information has been obtained indicating moving object exists in a previous period and a plurality of mutually adjacent first positions for which moving object existence information has been obtained indicating moving object exists in a recent period at least partially overlap, the contents of moving object existence information at positions included in third positions and not included in the first positions to indicate moving object exists.

4. A moving object detection method comprising the steps of:

(a) searching a number of locations along a predetermined line;

(b) generating an image signal for each location indicative of presence of a moving object along the line;

(c) compensating the image signal;

(d) linking image signals compensated in step (c) from each location to determine the presence of the moving object;

(e) filtering the signals linked in step (d) with characteristics determined according to an essential profile of the moving object;

(f) comparing the signals filtered in step (e) with filtered signals from previous searches to produce an output;

(g) storing information derived from the output; and (h) periodically executing steps (a) through (g).

5. A moving object detection apparatus comprising:

sensors for (i) searching a number of locations along a predetermined line and (ii) generating an image signal for each location indicative of presence of a moving object along the line;

a compensating device for compensating the image signal and producing a compensated signal thereby;

a generator for linking the compensated image signals from each location and at producing linked signals thereby;

filters for filtering the linked signals with characteristics determined according to an essential profile of the moving object and producing filtered signals thereby;

a comparing device for comparing the filtered signals with filtered signals from previous searches to produce an output; and a memory for storing information derived from the output.

* * * * *

UNITED STATES PATENT AND TRADEMARK OFFICE
CERTIFICATE OF CORRECTION

PATENT NO.   : 6,538,579 B1
DATED        : March 25, 2003
INVENTOR(S)  : Yoshikawa et al.

It is certified that error appears in the above-identified patent and that said Letters Patent is hereby corrected as shown below:

<u>Title page,</u>
Item [73], Assignee, please change Assignee address from "Toyoto (JP)"
to -- Toyota (JP) --

Signed and Sealed this

Tenth Day of June, 2003

JAMES E. ROGAN
*Director of the United States Patent and Trademark Office*